(12) United States Patent
Karger et al.

(10) Patent No.: US 8,458,259 B2
(45) Date of Patent: Jun. 4, 2013

(54) METHOD AND APPARATUS FOR DISTRIBUTING REQUESTS AMONG A PLURALITY OF RESOURCES

(75) Inventors: David Karger, Cambridge, MA (US); Eric Lehman, Cambridge, MA (US); F. Thomson Leighton, Newtonville, MA (US); Matthew Levine, Somerville, MA (US); Daniel Lewin, Cambridge, MA (US); Rina Panagrahy, Mountain View, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/336,745

(22) Filed: Dec. 23, 2011

(65) Prior Publication Data

US 2012/0124214 A1 May 17, 2012

Related U.S. Application Data

(60) Continuation of application No. 12/355,433, filed on Jan. 16, 2009, now Pat. No. 8,103,767, which is a continuation of application No. 11/268,679, filed on Nov. 7, 2005, now Pat. No. 7,500,002, which is a continuation of application No. 10/161,449, filed on Jun. 3, 2002, now Pat. No. 6,963,915, which is a division of application No. 09/042,228, filed on Mar. 13, 1998, now Pat. No. 6,430,618.

(51) Int. Cl.
*G06F 15/16* (2006.01)

(52) U.S. Cl.
USPC .......................................... 709/205; 709/238

(58) Field of Classification Search
USPC .................................................. 709/205, 238
See application file for complete search history.

(56) References Cited

U.S. PATENT DOCUMENTS

| | | | |
|---|---|---|---|
| 4,922,417 A | 5/1990 | Churm et al. |
| 5,109,511 A | 4/1992 | Nitta et al. |
| 5,287,499 A | 2/1994 | Nemes |
| 5,325,525 A | 6/1994 | Shan et al. |
| 5,477,582 A | 12/1995 | Yamashita |
| 5,511,208 A | 4/1996 | Boyles et al. |

(Continued)

FOREIGN PATENT DOCUMENTS

EP 0618708 A2 10/1994

OTHER PUBLICATIONS

Andreolini, Mauro et al., "Performance study of dispatching algorithms in multi-tier web architectures", ACM SIGMETRICS Performance Evaluation Review, Special Issue on PAPA 2002, vo. 30, is. 2, p. 10-20, 2002.

(Continued)

*Primary Examiner* — Patrice Winder
(74) *Attorney, Agent, or Firm* — Goodwin Procter LLP

(57) ABSTRACT

The invention relates to an apparatus for responding to data requests made by a client. The apparatus includes an input receiving a first data request that includes a sequence of nodes corresponding to a sequence of servers. The apparatus also includes decision logic determining whether the data specified in the data request is available on a selected server, and if the data is not available determining a next node from the sequence of nodes. The apparatus also includes a mapper mapping a server to the next node, and an output requesting the data by transmitting a second data request to the server mapped to the next node.

9 Claims, 21 Drawing Sheets

U.S. PATENT DOCUMENTS

| | | | |
|---|---|---|---|
| 5,542,087 | A | 7/1996 | Neimat et al. |
| 5,596,719 | A | 1/1997 | Ramakrishnan et al. |
| 5,659,786 | A | 8/1997 | George et al. |
| 5,768,552 | A | 6/1998 | Jacoby |
| 5,774,660 | A | 6/1998 | Brendel et al. |
| 5,774,668 | A | 6/1998 | Choquier et al. |
| 5,894,556 | A | 4/1999 | Grimm et al. |
| 5,915,095 | A | 6/1999 | Miskowiec |
| 5,933,849 | A * | 8/1999 | Srbljic et al. ................ 711/118 |
| 5,944,780 | A | 8/1999 | Chase et al. |
| 5,968,121 | A | 10/1999 | Logan et al. |
| 5,978,378 | A | 11/1999 | Van Seters et al. |
| 5,978,791 | A | 11/1999 | Farber et al. |
| 5,987,470 | A | 11/1999 | Meyers et al. |
| 5,996,013 | A | 11/1999 | Delp et al. |
| 6,006,264 | A | 12/1999 | Colby et al. |
| 6,009,275 | A | 12/1999 | DeKoning et al. |
| 6,029,219 | A | 2/2000 | Michizono et al. |
| 6,052,718 | A | 4/2000 | Gifford |
| 6,058,423 | A | 5/2000 | Factor |
| 6,078,946 | A | 6/2000 | Johnson |
| 6,081,840 | A | 6/2000 | Zhao |
| 6,085,193 | A * | 7/2000 | Malkin et al. ........................ 1/1 |
| 6,085,296 | A | 7/2000 | Karkhanis et al. |
| 6,108,703 | A | 8/2000 | Leighton et al. |
| 6,134,532 | A | 10/2000 | Lazarus et al. |
| 6,167,438 | A * | 12/2000 | Yates et al. .................... 709/216 |
| 6,175,870 | B1 | 1/2001 | Gawlick et al. |
| 6,191,786 | B1 | 2/2001 | Eyzaguirre et al. |
| 6,209,095 | B1 | 3/2001 | Anderson et al. |
| 6,230,196 | B1 | 5/2001 | Guenthner et al. |
| 6,233,601 | B1 * | 5/2001 | Walsh .......................... 709/202 |
| 6,240,466 | B1 | 5/2001 | McKeehan et al. |
| 6,256,675 | B1 | 7/2001 | Rabinovich |
| 6,260,039 | B1 | 7/2001 | Schneck et al. |
| 6,330,588 | B1 * | 12/2001 | Freeman ....................... 709/202 |
| 6,341,311 | B1 | 1/2002 | Smith et al. |
| 6,377,975 | B1 | 4/2002 | Florman |
| 6,457,047 | B1 | 9/2002 | Chandra et al. |
| 6,466,570 | B1 | 10/2002 | Low et al. |
| 6,477,582 | B1 | 11/2002 | Luo et al. |
| 6,539,416 | B1 * | 3/2003 | Takewaki et al. ............. 709/202 |
| 6,553,420 | B1 | 4/2003 | Karger et al. |

OTHER PUBLICATIONS

Bestavros, Azer. "Speculative Data Dissemination and Service to Reduce Server Load, Network Traffic and Service Time in Distributed Information Systems." In Proceedings of ICDE'96: The 1996 International Conference on Data Engineering, Mar. 1996, 4pgs.

Browne et al., "Location-Independent Naming for Virtual Distributed Software Repositories," SSR '95 Proceedings of 1995 Symposium on Software Reusability, ACM, pp. 179-185.

Carter, J. Lawrence, et al. "Universal Classes of Hash Functions." Journal of Computer and System Sciences, vol. 18, No. 2, Apr. 1979, pp. 143-154, 991-993.

Chankhunthod, Anawat, et al. "A Heirarchical Internet Object Cache." In USENIX Proceedings, Jan. 1996, pp. 153-163.

Cohen, J. et al. "Cache Array Routing Protocol v1.1" Sep. 29, 1997, pp. 1-8, http://www.watersprings.org/pub/id/draft-vinod-carp-v1-01.txt, downloaded on Nov. 20, 2001.

Cormen, Thomas H., et al. Introduction to Algorithms, The MIT Press, Cambridge, Massachusetts, 1994, pp. 219-243.

Danzig, Peter, "NetCache Architecture and Deployment" Feb. 2, 1997, pp. 1-10, http://wwwcache.ja.net/events/workshop/01/Netcache-3.sub.--2.pdf, downloaded on Nov. 20, 2001.

Deering, Stephen, et al. "Multicast Routing in Datagram Internetworks and Extended LANs" ACM Transactions on Computer Systems, vol. 8, No. 2, May 1990, pp. 85-110.

Devine, Robert, "Design and Implementation of DDH: A Distributed Dynamic Hashing Algorithm." In Proceedings of 4th International Conference on Foundations of Data Organizations and Algorithms, 1993, pp. 101-114.

Doi, Katsuo, "Super Proxy Script" Copyright 1996-2000, pp. 1-9, http://naragw.sharp.co.jp/sps/, downloaded on Nov. 20, 2001.

Feeley, Michael, et al. "Implementing Global Memory Management in a Workstation Cluster." In Proceedings of the 15th ACM Symposium on Operating Systems Principles, 1995, pp. 201-212.

Floyd, Sally, et al. "A Reliable Multicast Framework for Light-Weight Sessions and Application Level Framing." In Proceedings of ACM SIGCOMM'95, 1995, 342-356.

Fredman, Michael, et al. "Storing a Sparse Table with 0(1) Worst Case Access Time." Journal of the Association for Computing Machinery, vol. 31., No. 3, Jul. 1984, pp. 538-544.

Grigni, Michelangelo, et al. "Tight Bounds on Minimum Broadcasts Networks." SIAM Journal of Discrete Mathematics, vol. 4, No. 2, May 1991, pp. 207-222.

Gwertzman, James, et al. "The Case for Geographical Push-Caching." Technical Report HU TR 34-94 (excerpt), Harvard University, DAS, Cambridge, MA 02138, 1994, 2 pgs.

Gwertzman, James, et al. "World-Wide Web Cache Consistency." In Proceedings of the 1996 USENIX Technical Conference, Jan. 1996, 8 pgs.

Karger et al., "Consistent Hashing and Random Trees: Distributed Caching Protocols for Relieving Hot Spots," on the World Wide Web, STOC '97 Proceedings of the 29th Annual ACM Symposium on Theory of Computing, ACM, pp. 654-663.

Karger, D. et al. "Finding the hidden path: time bounds for all-pairs shortest paths", IEEE Proceed. on Foundations of Computer Science, ISBN:0-8186-2445-0, pp. 560-568, Oct. 1991.

Karger, David, et al. "Consistent Hashing and Random Trees: Distributed Caching Protocols for Relieving Hot Spots on the World Wide Web." In Proceedings of the Twenty-Ninth Annual Symposium on Theory of Computing, May 1997, pp. 654-663.

Lehman, E. et al. "Logic decomposition during technology mapping", IEEE Transaction on Computer-Aided Design of Intergrated Circuits and Systems, ISSN: 0278-0070, pp. 813-834, Aug. 1997.

Litwin, Withold, et al. "LH—A Scaleable, Distributed Data Structure." ACM Transactions on Database Systems, vol. 21, No. 4, Dec. 1996, pp. 480-525.

Malpani, Radhika, et al. "Making World Wide Web Caching Servers Cooperate." in Proceedings of World Wide Web Conference, 1996, 6 pgs.

Microsoft Corporation, "Cache Array Routing Protocol" Copyright 2001, pp. 1-2, http://www.microsoft.com/TechNet/prodtechnol/isa/proddocs/isadocs/m.-sub.—c.sub.—c.sub.—arrayrouting.asp, downloaded on Nov. 20, 2001.

Naor, Moni, et al. "The Load, Capacity and Availability of Quorum Systems." In Proceedings of the 35th IEEE Symposium on Foundations of Computer Science, Nov. 1994, pp. 214-225.

Nisan, Noam, "Pseudorandom Generators for Space-Bounded Computation." In Proceedings of the Twenty-Second Annual ACM Symposium on Theory of Computing, May 1990, pp. 204-212.

Palmer, Mark, et al. "Fido: A Cache that Learns to Fetch." In Proceedings of the 17th International Conference on Very Large Data Bases, Sep. 1991, pp. 255-264.

Panigrahy, Rina. Relieving Hot Spots on the World Wide Web, Massachusetts Institute of Technology, Jun. 1997, pp. 1-66.

Peleg, David, et al. "The Availability of Quorum Systems." Information and Computation 123, 1995, 210-223.

Plaxton, C. Greg, et al. "Fast Fault-Tolerant Concurrent Access to Shared Objects." In Proceedings of the 37th IEEE Symposium on Foundations of Computer Science, 1996, pp. 570-579.

Rabin, Michael, "Efficient Dispersal of Information for Security, Load Balancing, and Fault Tolerance." Journal of the ACM, vol. 36, No. 2, Apr. 1989, pp. 335-348.

Ravi, R., "Rapid Rumor Ramification: Approximating the Minimum Broadcast Time." In Proceedings of the 35th IEEE Symposium on Foundations of Computer Science, Nov. 1994, pp. 202-213.

Ross, Keith, W., "Hash-Routing for Collections of Shared Web Caches" Sep. 1997, 1-21, http://citeseer.nj.nec.com/90285.html, downloaded on Nov. 20, 2001.

Schmidt, Jeanette, "Chernoff-Hoeffding Bounds for Applications with Limited Independence." In Proceedings of the 4th ACS-SIAM Symposium on Discrete Algorithms, 1993, pp. 331-340.

Shaohua Deng, P. "Fast control in object-oriented repetitive access", IEEE Proceed. on Security Technology, ISBN: 0-7803-1479-4, pp. 173-175, Oct. 1994.

Sharp Corp., "Briefing on Super Proxy Script" Copyright 1996-1998, pp. 1-11, http://naragw.sharp.co.jp/sps-e.html, downloaded on Nov. 20, 2001.

Tarjan, Robert Endre, et al. "Storing a Sparse Table." Communications of the ACM, vol. 22, No. 11, Nov. 1979, pp. 606-611.

Thaler, David G. et al. "Using Name-Based Mappings to Increase Hit Rates" IEEE/ACM Transactions on Networking, vol. 6, No. 1, Feb. 1998, pp. 1-19, ACM Press, http://citeseer.nj.nec.com/thaler97using.html, downloaded on Nov. 20, 2001.

Topcuoglu, H. et al. "The software architecture of a virtual distributed computing environment", IEEE Proceed. on High Performance Distributed Computing, ISBN: 0-8186-8117-9, pp. 40-49, Aug. 1997.

Valloppillil, Vinod et al. "Cache Array Routing Protocol v1.0" Jun. 30, 1997, pp. 1-7, http://www.watersprings.org/pub/id/draft-vinod-carp-v1-00.txt.

Valloppillil, Vinod et al. "Cache Array Routing Protocol v1.0" Oct. 20, 1997, pp. 1-7, http://www.watersprings.org/pub/id/draft-vinod-carp-v1-02.txt, downloaded Nov. 20, 2001.

Valloppillil, Vinod et al. "Cache Array Routing Protocol v1.0" Feb. 26, 1998, 1-7, http://icp.ircache.net/carp.txt, downloaded on Nov. 20, 2001, downloaded on Nov. 20, 2001.

Valloppillil, Vinod et al. "Heirarchical HTTP Routing Protocol" Apr. 21, 1997, pp. 1-7, http://icp.ircache.net/draft-vinod-icp-traffic-dist-00.txt, downloaded on Nov. 20, 2001.

Vitter, Jeffrey Scott, et al. "Optimal Prefetching via Data Compression." In Proceedings of the 35th IEEE Symposium on Foundations of Computer Science, Nov. 1994, pp. 121-130.

Wegman, Mark, et al. "New Hash Functions and Their Use in Authentication and Set Equality." Journal of Computer and System Sciences vol. 22, Jun. 1981, pp. 265-279.

Wessels, D. "Internet Cache Protocol (ICP), version 2" Mar. 25, 1997, pp. 1-9, http://www.watersprings.org/pub/id/draft-wessels-icp-v2-01.txt, downloaded on Nov. 20, 2001.

Wessels, D. et al. "Internet Cache Protocol (ICP), version 2" May 27, 1997, pp. 1-9, http://www.watersprings.org/pub/id/draft-wessels-icp-v2-03.txt, downloaded on Nov. 20, 2001.

Wessels, D. et al. "Internet Cache Protocol (ICP), version 2" Nov. 5, 1996, pp. 1-7, http://www.watersprings.org/pub/id/draft-wessels-icp-v2-00.txt, downloaded on Nov. 20, 2001.

Wu et al., "Load balancing and hot spot relief for hash routing among a collection of proxy caches", IEEE Inter. Conf. on DistributedComputing Systems, p. 536-543, Jun. 1999.

Yang et al. "An effective mechanism for supporting content-based routing in scalable Web server clusters", IEEE Proceed. on Parallel Processing, ISBN: 0-7695-0353-5, pp. 240-245, Sep. 1999.

Yao, Andrew Chi-Chih. "Should Tables be Sorted?" Journal of the Association for Computing Machinery, vol. 28, No. 3, Jul. 1981, pp. 615-628.

* cited by examiner

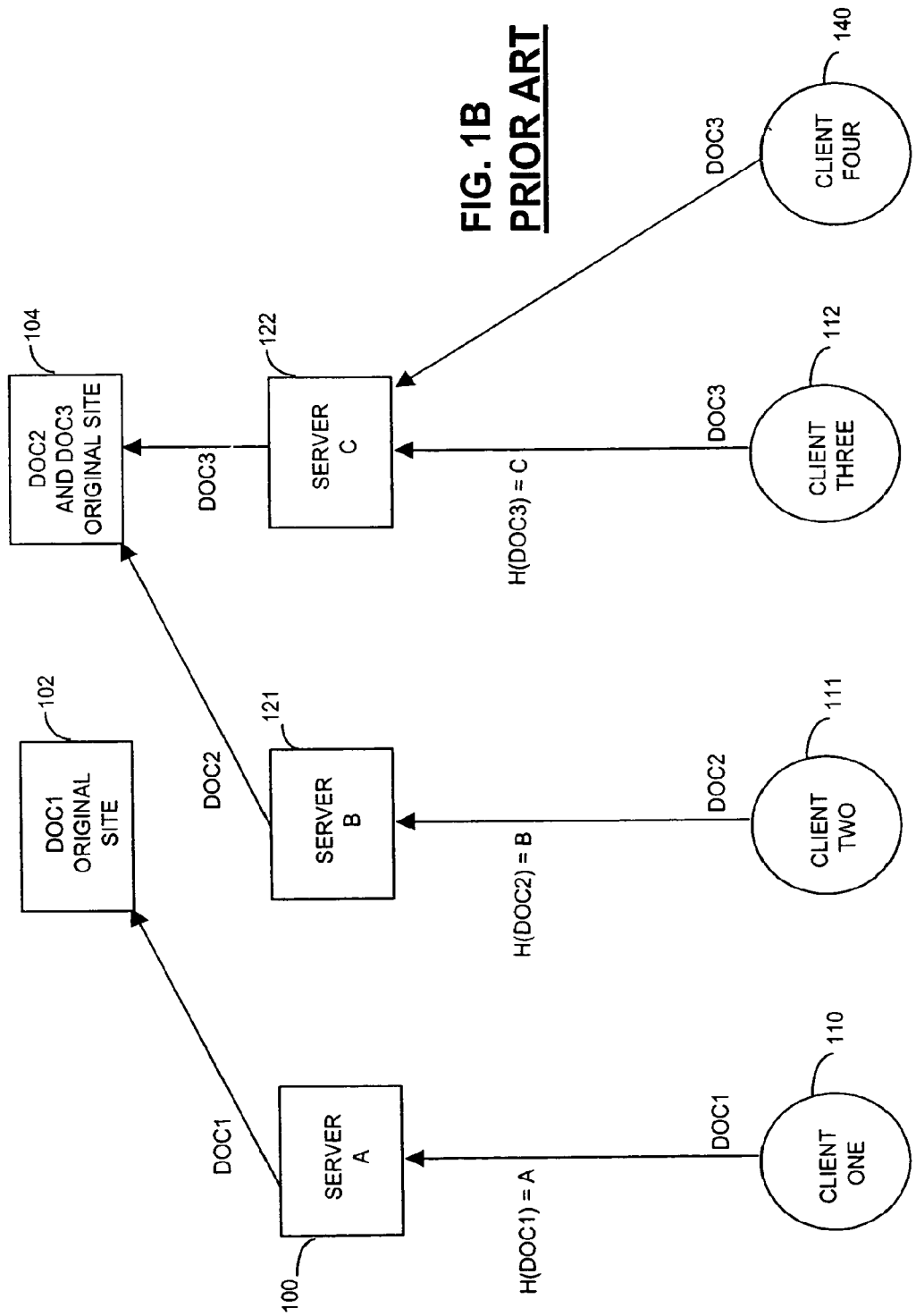

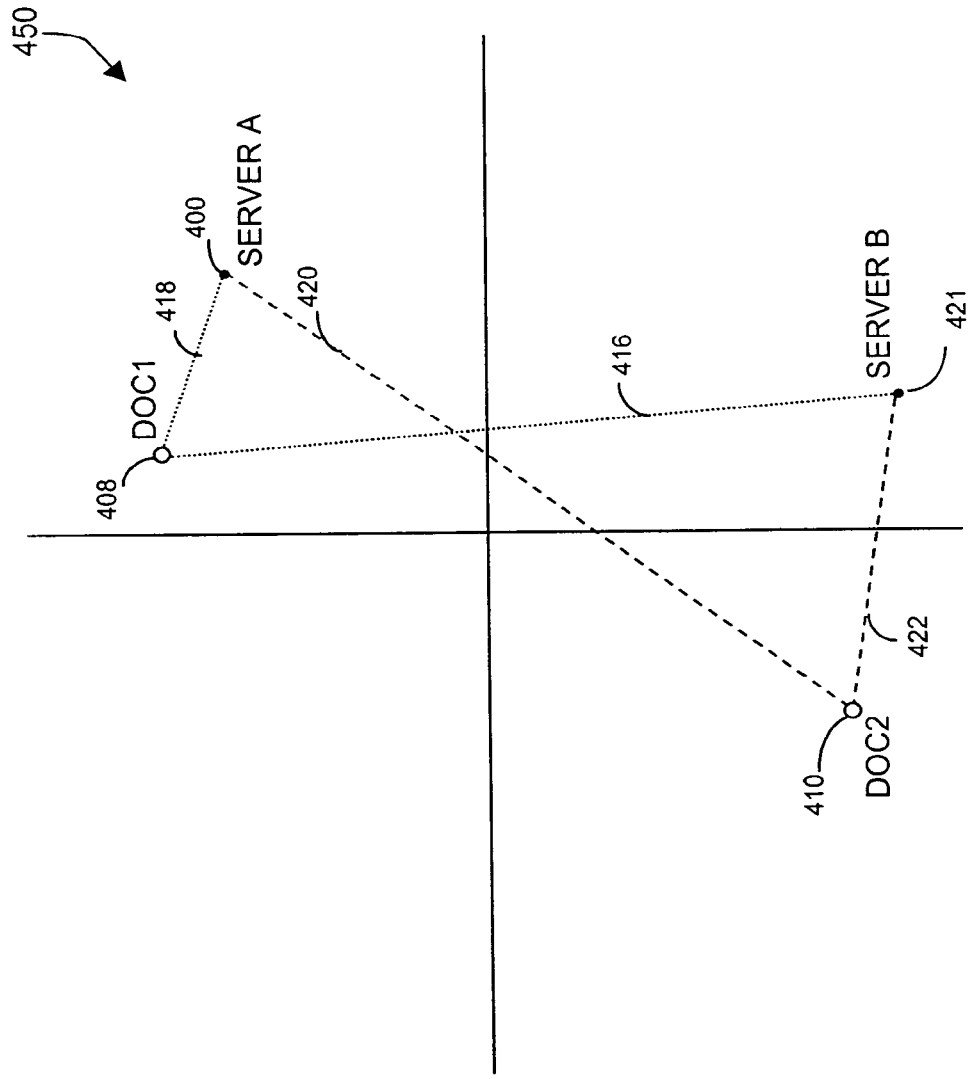

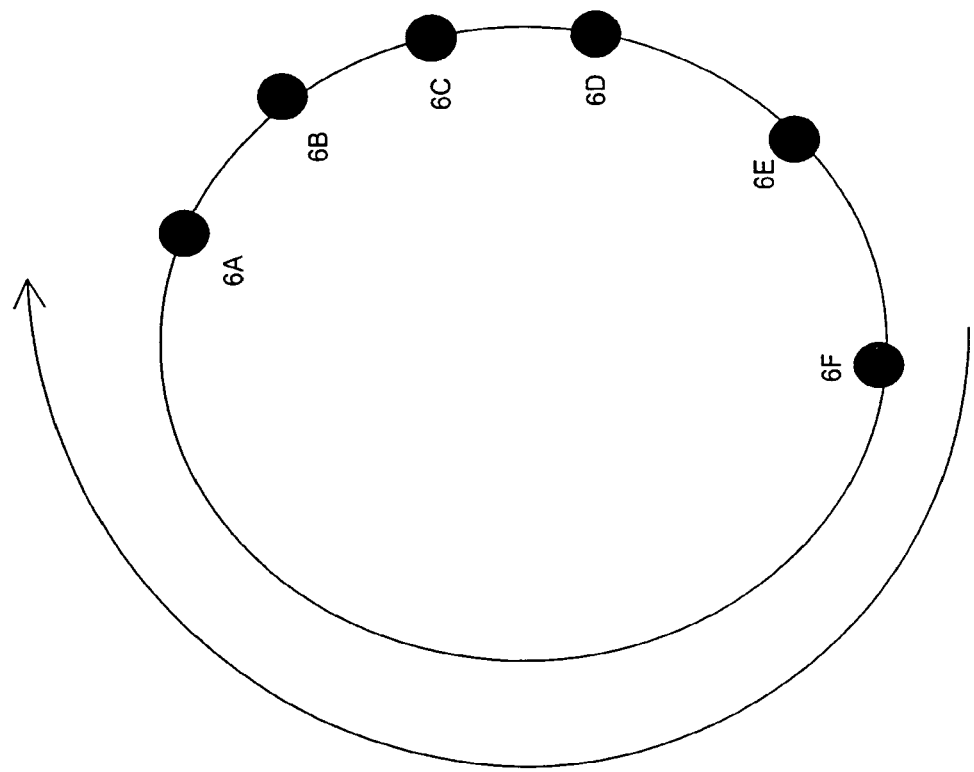

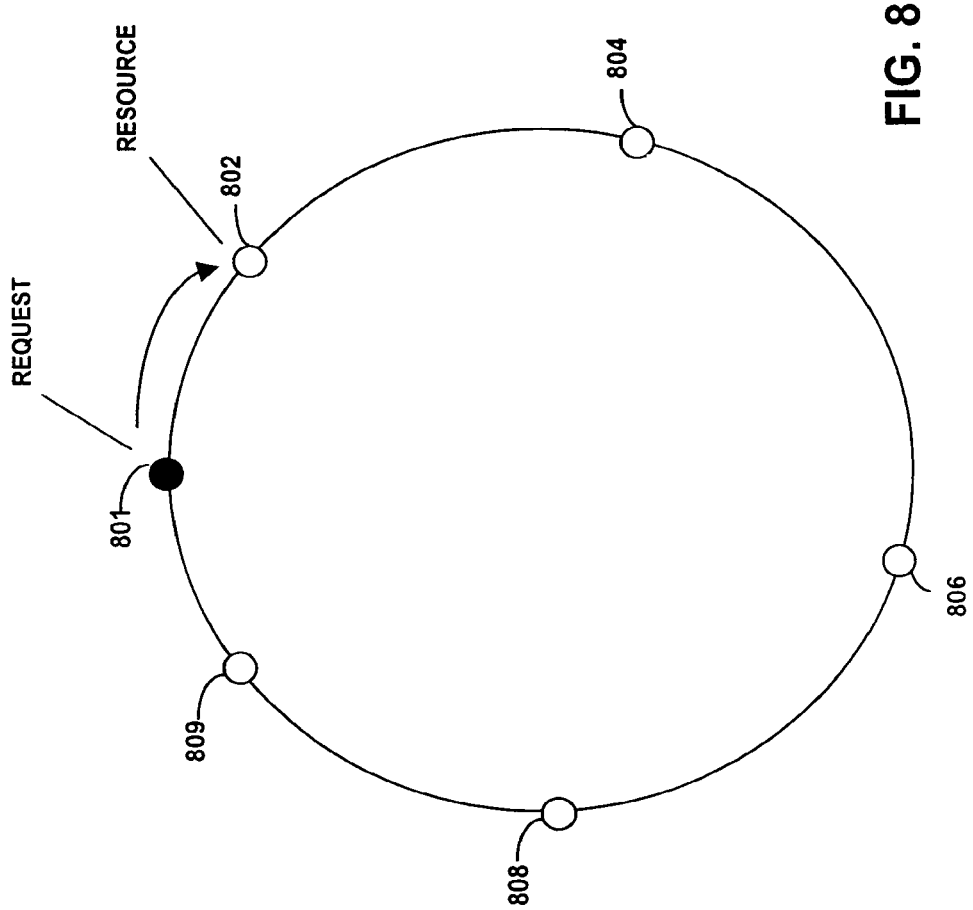

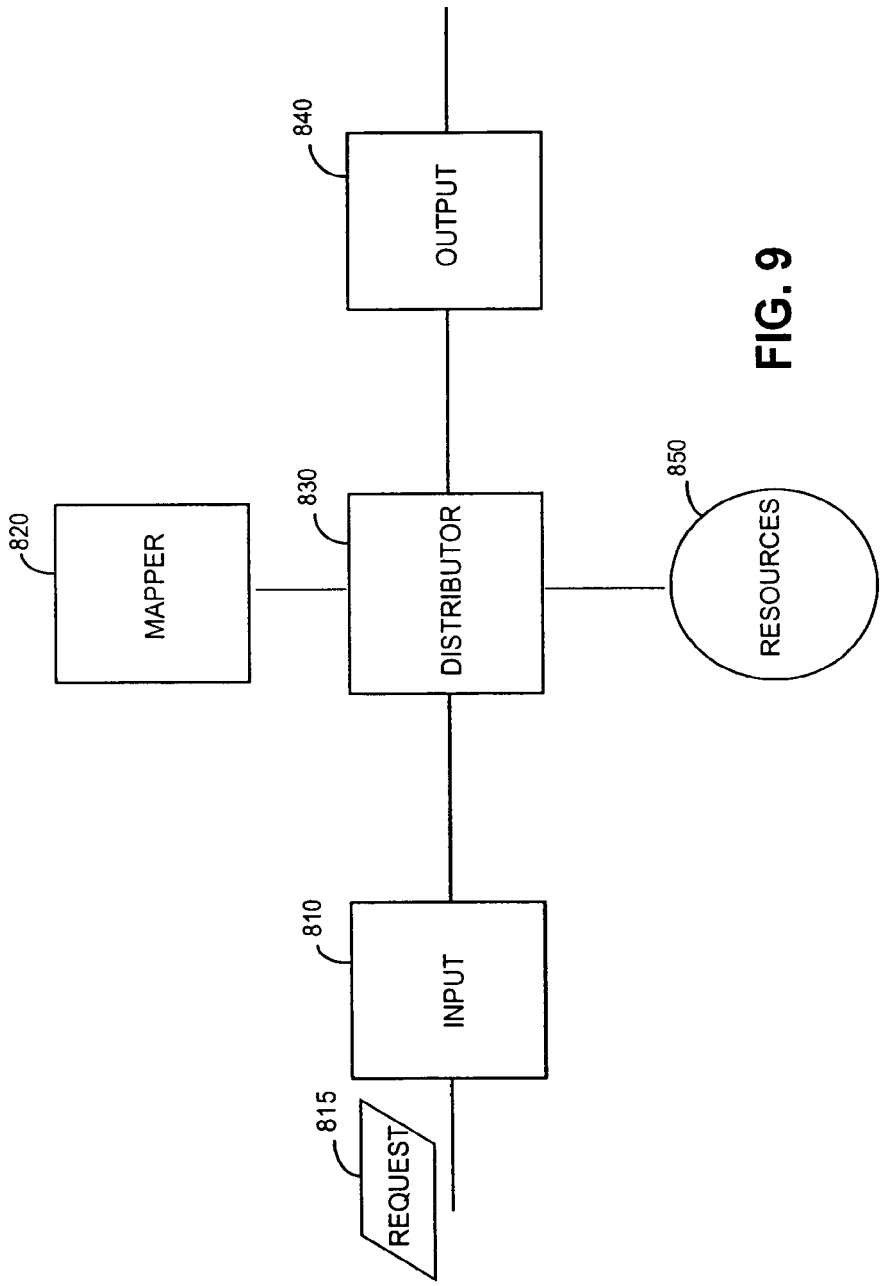

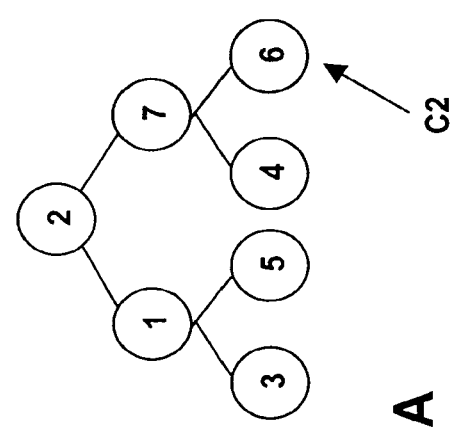
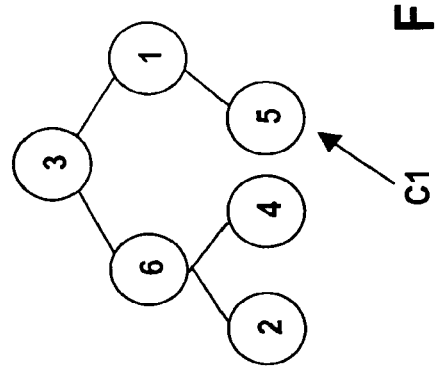
FIG. 15A
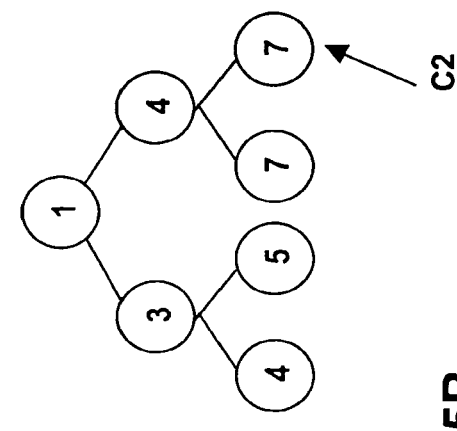
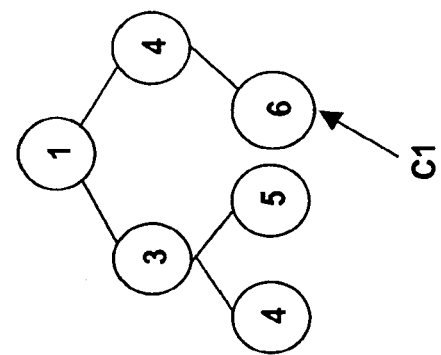
FIG. 15B

METHOD AND APPARATUS FOR DISTRIBUTING REQUESTS AMONG A PLURALITY OF RESOURCES

CROSS-REFERENCE TO RELATED APPLICATIONS

This application is a continuation of, claims priority to and the benefit of, and incorporates herein by reference in its entirety U.S. patent application Ser. No. 12/355,433, which was filed on Jan. 16, 2009. U.S. patent application Ser. No. 12/355,433 is a continuation of U.S. patent application Ser. No. 11/268,679, filed on Nov. 7, 2005 and now U.S. Pat. No. 7,500,002, which is itself a continuation of U.S. patent application Ser. No. 10/161,449, filed on Jun. 3, 2002 and now U.S. Pat. No. 6,963,915, which is in turn a divisional of U.S. patent application Ser. No. 09/042,228, filed on Mar. 13, 1998 and now U.S. Pat. No. 6,430,618, the entire contents of each of which are hereby incorporated herein by reference.

GOVERNMENT SUPPORT

Work described herein was supported by Federal Grant No. DAAH04-95-10607, awarded by the United States Army, Federal Grant No. N00014-95-1-1246, awarded by the United States Navy, and CCR-9624239, awarded by the National Science Foundation. The Government has certain rights in the invention.

FIELD OF THE INVENTION

The invention relates to allocating resource requests to the available resources. More specifically, the invention relates to distributing information requests to servers capable of storing and providing the requested information.

BACKGROUND OF THE INVENTION

In large distributed information systems there are servers that store information and there are clients that request information. The World Wide Web ("Web") is an example of a distributed information system. There are web sites, which act as servers, and there are clients, which are computers used by people to obtain information from the servers. The users request information from the web sites and the web sites respond to the requests by providing the requested information in the form of data, documents, files, or web pages.

Immense growth of the Web places great demands on the infrastructure of the Internet that provides the physical connections for the Web. Service providers invest vast sums of money in Internet infrastructure in an attempt to provide acceptable performance despite increasing data demand. Acceptable performance generally implies little or no delay in accessing information. Two causes of delay are heavy communication loading a part of a network and a large number of requests loading a particular server. When part of the network becomes congested with too much traffic, communication over that part of the network becomes unreliable and slow. Similarly, when too many requests are directed at a single server, the server becomes overloaded, or "swamped."

One of these problems can cause the other, in part because network software is typically designed to repeat requests that are not responded to promptly. For example, if a server is overloaded, it will not respond to requests quickly, and requests may be resent, thereby increasing network traffic. If a network is overloaded, a request may not reach a server quickly, and a duplicate request may be sent to the server before the server had a chance to respond to the first request, thereby increasing the load on the server. Both network overload and server overload lead to delays in retrieving information.

A server can become overloaded for various reasons. A server storing a few documents that have very high access rates can become overloaded. An example of this kind of server is a web site that becomes very popular such as a site reporting results of a popular sports event. A server responsible for such a site can become overloaded with a large volume of requests for a one or a small number of documents containing the latest information on the event. Another type of server that can become overloaded is a server storing a large number of documents each of which is accessed at normal or even relatively low access rates. The server becomes overloaded as it attempts to serve a large number of requests for many different documents. An example of this kind of server is a server for a large organization, such as a library, that serves a vast number of documents that are accessed on a regular basis.

A general strategy employed to reduce both network traffic and overloaded servers is replication accomplished by caching. Copies of frequently requested documents can be stored throughout the network, thereby spreading the work of serving the documents across several servers. In one approach, several clients share a cache server in a manner that is transparent to the people using it. Client requests are forwarded through the cache server, which keeps copies of frequently requested documents and attempts to satisfy requests with a cached copy. If the cache server has a copy of the document, then the request can be answered immediately with the requested document. If the cache server does not have a copy, then the cache server can request a copy of the document from the original site. When the cache server receives a copy of the document from another cache server or from the original site for the document, it can then answer the client's request. Subsequent requests for that document can be serviced by the cache because it has a copy of the document. Thus, the load on the original site for the document is reduced because the original site does not need to be involved in every request.

Referring to FIG. 1A, three clients, Client One 110, Client Two 111, and Client Three 112, each request documents Doc1, Doc2, and Doc3 respectively via Cache Server A 100. The cache server answers all three of these requests in a manner that is transparent to the users. If Server A 100 does not have the documents requested by Client One 110, Client Two 111, and Client Three 112, it requests the documents from the Original Sites 102, 104 for the documents. Once it receives the documents it sends the documents to the Clients 110-112.

Caching can reduce network traffic if the cached copy is close, in the network topology sense, to the requester because fewer network links and resources are used to retrieve the information. Caching can also relieve an overloaded server because some of the requests that would normally be routed to the original site can be served by a cache server, and so the number of requests made of the original site is reduced. There is a tradeoff of a greater performance benefit if more clients share the same cache server that is balanced against an increased likelihood that the cache server itself will become overloaded.

One approach to solving this dilemma is to use a group of servers that function together as a cache. Responsibility for answering requests is divided among the group. There are many ways to divide responsibility among the group of servers. One way is to have a client's request for a document be directed to an arbitrary one of the servers of the group of cache servers. If a copy of the document is stored in that server, it is transmitted to the client. If a copy is not stored in that server, the request is forwarded to the original site of the document. This approach divides the load among the servers, thereby preventing overload of any particular server. A client needs to know which servers are available, but the client does not need information about the servers to choose one. One disadvantage of this approach is that each of the servers will request each document from the original site for that document. This could load the original site as the number of cache servers increases.

Alternatively, the server could, if it does not have a copy of the document, first forward the request to the other cache servers. One disadvantage of this technique is that as the number of participating servers grows, the number of messages between the cache servers can become problematic.

Another approach also uses a group of servers but allocates responsibility for documents to particular servers. As part of this approach, the client is informed about the allocation of documents to servers so it can address a request to the server with responsibility for that document. Instead of arbitrarily choosing a cache, a client chooses the cache server allocated to the document requested. For this approach to be successful, it cannot be unduly burdensome on the client to determine which cache server to direct a document request. It is also necessary to balance the load appropriately among the caches. For example, even if all documents are accessed by clients at the same rate, if some caches contain more documents than others, those caches will have more requests to service, and may become overloaded.

In the context of caching, it would be unduly burdensome to maintain a list of all the documents available in the cache servers. Such a list would have to be maintained as documents were added and deleted from the original site. An alternative approach is for clients to use a standard hash function to determine from which server to request a document. In FIG. 1B, a standard hash function (h) is used by the clients to choose among three cache servers. Client One 110 requests Doc1 from Server A 100 since h(Doc1)=Server A. Client Two 111 requests Doc2 from Server B 121 since h(Doc2)=Server B. In this example, Server B 121 does not have the requested document, so it requests the document from the original site for Doc2 104. Client Three 112 requests Doc3 from Server C 122 since h(Doc3)=Server C. Server C 122 does not have Doc3, so Server C 122 requests the document from Doc3's Original Site 104. In this example, after obtaining a copy of the requested document, Server C 122 stores the document. When Client Four 140 requests Doc3, it also requests it from Server C 122, since h(Doc3)=Server C. Server C 122 already has Doc3 since it previously obtained a copy to service the request from Client Three 112. Server C 122 is able to respond to the request without placing any additional load on the network between Server A 100 and Server C 122 and without requiring Server A 100 to take on the load of the request from Client Four 140. The hash function serves as a method for users to agree on which server is responsible for a document.

Hashing with a standard hash function has the same effect as distributing the items randomly, because a standard hash function will tend to distribute items approximately evenly throughout its output range. This is very desirable because a random assignment of documents to servers will spread the load of serving the active set of documents among the servers. An example of a standard hash function that can be used to distribute documents to servers is $f(d)=((ad+b) \bmod n)$, where document names (d) are integers, there are (n) servers $\{0, 1, 2, \ldots, n-1\}$, and (a) and (b) are some fixed choice of integers. For most choices of (a) and (b) the function distributes documents roughly evenly over the servers.

Referring to FIG. 2A, an original distribution of one hundred thirty-four documents to servers is shown. Here, the document names are integers, and there are 13 servers $\{1, 2, \ldots, 13\}$. Some servers store many more documents than others, and thus in the model of equal access frequency these servers are more heavily loaded. FIG. 2B shows the distribution of documents to servers using a standard hash function such as $f(d)=((ad+b) \bmod 13)$. In the distribution of FIG. 2B, no server is responsible for a disproportionately large share of documents.

One disadvantage of using a standard hash function to allocate documents, and, therefore, documents requests, to servers is that a change in the number of servers can be disruptive to the caching scheme. In networks such as the Internet, servers frequently may be added to, or removed from, the network, and these changes need to be incorporated into a caching scheme. With the hash function just discussed, adding a server to the scheme requires changing the range of the hash function to include the new server. Changing the range of the hash function may result in many documents changing location. For example, if there are (n) servers and the hash function mapping documents to servers is $f(d)=((ad+b) \bmod n)$, then when a server is added, the hash function is changed to $f'(d)=((ad+b) \bmod (n+1))$.

An example of the change of mapping of documents to servers caused by a change in the number of servers is shown in FIG. 3A and FIG. 3B. FIG. 3A illustrates the assignment of 10 documents to 4 servers using the hash function $f(d)=(d+1) \bmod 4$. FIG. 3B illustrates the assignment after one additional server is added and the hash function is changed to $f(d)=(d+1) \bmod 5$. In FIG. 3B, circles show the mapping with 4 servers and squares show the mapping with 5 servers. Almost every document is mapped to a different server as a result of the addition of the new server.

A characteristic of this hash function and many other standard hash functions is that when the range of the function is modified, the mapping is completely reshuffled. That is, most documents are mapped to different servers than they were mapped to before the change. A complete reshuffling of the distribution of documents to servers is quite disruptive to a caching scheme. After each server is added, every server will need to request copies of the documents for which it is now responsible from the original document sites. Adding or removing a server, therefore, places a load on the cache servers and the original sites.

In addition to the problem of reshuffling data upon a change in the number of servers there is another complication. When a change in the number of servers occurs, users have to be notified of the change so that they can start to use a new hash function that includes the new number of cache servers. If users can be notified of the change simultaneously this does not present a problem, but in a network such as the Internet, such global synchronous notification is very difficult to achieve. It is feasible, however, to assume that notification about server changes can be done by slowly propagating the information from system to system, for example in a manner similar to the way that network news is distributed. As a consequence, the set of cache servers recognized by each user may differ widely. A user's "view" is a term for the set of servers that the user knows exist. Because synchronous notification is impossible, different users are very likely to have different views.

The example of FIG. 3A and FIG. 3B can also be used to illustrate the effects of multiple views of the servers on the caching scheme. If some users are aware of the addition of server 4 and some of the users are not aware of the addition of server 4, then there are two views of the system held by users. One view (the "old" view) is {0, 1, 2, 3} and the other view (the "new" view) is {0, 1, 2, 3, 4}. Users not aware of the addition of server 4 use the old mapping of documents to servers represented by the circles. Users aware of the new server 4 use the new mapping represented by the squares, which is almost a complete reshuffling of the old mappings. To work in a scheme where users have different views, cache servers must serve requests for the documents allocated in all users' views. As a result, the number of documents that a server is responsible for, in this example in which one server was added, is almost doubled. For example, users with the old view use server 2 for the documents 5 and 29, while users with the new view use server 2 for documents 11 and 36. Server 2 will receive requests for all of these documents, thus effectively doubling the requirements on the server. The total number of documents that a server is responsible for is called its load. Referring to FIG. 3B, the load of server 2 is 4 since there are two documents from each view. Using a standard hash function, each view increases the load.

A further complication results from having a single document assigned to different cache servers in different views. If there are many clients with many different views, then a large number of cache servers can be responsible for a document. This in turn implies that the original site is more likely to become overloaded with requests for copies from multiple cache servers. For example, referring to FIG. 3A and FIG. 3B, document 7 is assigned to server 0 in the view {0, 1, 2, 3} and to server 3 in the view {0, 1, 2, 3, 4}. The original site for document 7 has to supply a copy to both server 0 and server 3. The total number of servers to which a document is assigned is called the spread of the document. For example, the spread of document 5 in the example of FIG. 3A and FIG. 3B is 2. Using a standard hash function, the spread of a document increases with the number of views.

In summary, the use of standard hash functions to identify a resource (for example, a cache server) for a particular request (for example, a document) results in a greatly increased load and spread when the number of resources (cache servers) changes, and there are, accordingly, multiple views. This drawback can have a great impact on performance when the number of documents and servers is large.

It should be noted that the approach of allocating responsibility for each document to different servers is less effective when the cache is experiencing a large number of requests for the same small number of documents. The large number of requests will all go to the small number of servers responsible for the small number of documents The small number of servers are likely to be overloaded by the large number of requests.

One approach for preventing one server from being overloaded by a large number of requests for the same document is to use a group of caches in series between the user and the original site of the document, each of which can service the request for the document. In one embodiment of this approach, if a first cache server does not have a document, it requests the document from another (second) cache and not the original site. The second cache services a defined group of first-level caches. If the second cache does not have the document, the second cache requests the document from yet another (third) cache. The third cache services a defined group of second-level caches. This continues until the last cache in the series does not have the document, at which point the last cache requests the document from the original site. This approach provides cache layers between the first cache and the original site and it spreads the load among the caches at each layer. Different users can use different lists of caches for the same document, thereby spreading the load. The list of servers to request the document from can be derived in various ways.

One approach is to use a tree of caches. In this approach, a user requests a document by requesting the document from a server representing a first node on a tree of caches. If this cache does not have the document, the request is forwarded to the next cache in the tree. If the next cache does not have the document, the request is forwarded from that cache to the next cache and so on. If a document is not stored by any intermediate cache in the tree, the request eventually reaches the root of the tree and is forwarded to the original site of the document. In this approach, a cache retains a copy of any document it obtains for a period of time. An advantage of a cache tree is that a cache receives document requests only from the caches that come before it, and this limits the number of requests that arrive simultaneously. Thus, many requests for a document in a short period of time will only cause one request to the original server of the document, and will not result in cache server overload.

One theoretical disadvantage of this system is that the root receives at least one request for every distinct document requested of the entire cache tree. This can overload the root with requests if the number of distinct document requests grows too large, meaning that this approach suffers from potential scaling problems.

SUMMARY OF THE INVENTION

One aspect of the invention is a caching system that prevents server and network overloading and scales gracefully even when clients have multiple views. Resources can be added and removed from a pool of available resources without a reallocation of all or even most of the requests. Only the requests associated with the server added or removed have to be reallocated. This is referred to as "consistent hashing" because for most of the set of requests, the allocation is consistent even as resources are added and removed. Only a subset of all the requests are allocated to different resources. With regard to caching data, consistent hashing avoids increasing load and spread when the number of servers changes.

In another aspect, a series of servers is used that are chosen in a manner that spreads the load associated with a small number of frequently requested documents, and thereby prevents overloading. This is referred to as "virtual networks." When used together, consistent hashing and virtual networks improve the ability of document servers generally and caching servers in particular to respond to large numbers of requests.

In one aspect, the invention relates to a method and apparatus for distributing a request to one of a plurality of resources that includes mapping the request to a request location in mathematical mapping space, mapping each of the resources to a respective at least one resource location in mathematical mapping space, and allocating the request to one of the resources based on a mathematical relationship between the request and resource locations. An apparatus for distributing a request to one of a plurality of resources includes the plurality of resources and an input receiving a resource request. A mapper in communication with the input maps the request to a request location in a mathematical mapping space and maps each of the plurality of resources to at least one resource locations in the mathematical mapping space. A distributor distributes the request to one of the plurality of resources in response to a mathematical relationship between the locations of the request and resources in the mathematical mapping space.

In one embodiment, the mathematical mapping space is a circle. In one embodiment the request is a data request and the resource is a server. In one embodiment the step of mapping each of the resources to a respective at least one resource location comprises hashing each of the resources to a respective resource location in the mathematical mapping space.

The invention also relates to a computer-readable medium whose contents cause a computer system to distribute a request to one of a plurality of resources. The computer system executes the contents of the computer-readable medium by performing a computer program. The computer program maps the request to a request location in a mathematical mapping space and maps each of the resources to a respective at least one location in the mathematical mapping space. The computer program allocates the request to one of the resources based on a relationship between the request location and the resource locations in the mathematical mapping space.

Another aspect of the invention relates to a method for requesting data from one of a plurality of servers. The method includes generating an virtual network of nodes in response to a data request and randomly choosing a first node on the virtual network of nodes. The method also includes generating a path from the first node to the root node on the virtual network of nodes and mapping at least one node on the path to a respective one of the plurality of servers. The method also includes requesting data from the one of the plurality of servers.

In one embodiment, the step of requesting data from one of the plurality of servers is accomplished with a data request comprising identification of the desired data and a sequence of nodes through which the request should be directed. In one embodiment, the data request also comprises a sequence of servers that should act as the nodes. In one embodiment requesting the data from the server mapped to the chosen node includes transmitting a request from a client to the server. In one embodiment mapping at least one node on the path to a respective one of the plurality of servers comprises calculating a hash function. In one embodiment mapping a node on the path to a respective one of the servers includes mapping the node to a node location and each of the servers to at least one server location in a mathematical mapping space and allocating the node to one of the servers based on a mathematical relationship between the node location and the server locations in the mathematical mapping space.

The invention also relates to an apparatus for requesting data from one of a plurality of servers. The apparatus includes an input receiving a data request and a path generator in communication with the input that randomly chooses a node on an virtual network and generates at least one path of nodes in response to the data request. The apparatus also includes a mapper in communication with the path generator mapping nodes on the at least one path of nodes to one of the plurality of servers. The apparatus also includes an output in communication with the mapper and requesting data from the one of the plurality of servers mapped to the nodes on the at least one path of nodes.

In another aspect, the invention relates to a method for responding to data requests made by a client. The method includes receiving a first data request that includes a sequence of nodes corresponding to a sequence of servers. The method also includes determining whether the data specified in the data request is not available on a selected server. If the data is not available, the method also includes determining a next node from the sequence of nodes, mapping a server to the next node, and requesting the data by transmitting a second data request to the server mapped to the next node.

In one embodiment the step of mapping a server to the next node comprises calculating a hash function. In one embodiment the first data request is substantially similar to the second data request. In one embodiment the second data request includes a sequence of nodes. In one embodiment the method further includes receiving the data from the server mapped to the next node in response to the second data request, determining the total number of times the data in the first data request has been requested, and caching the data requested by the first data request if the count of the number of times the data in the first data request was requested exceeds a threshold. In one embodiment the method includes the step of responding to the first request by transmitting the data.

The invention also relates to an apparatus for responding to data requests made by a client. The apparatus includes an input receiving a first data request that includes a sequence of nodes corresponding to a sequence of servers. The apparatus also includes decision logic determining whether the data specified in the data request is available on a selected server, and if the data is not available determining a next node from the sequence of nodes. The apparatus also includes a mapper mapping a server to the next node. The apparatus also includes an output requesting the data by transmitting a second data request to the server mapped to the next node.

BRIEF DESCRIPTION OF THE DRAWINGS

FIG. 1B is a block diagram of clients using a hash function to request documents from different cache servers as known to the prior art;

FIG. 4C is an embodiment of a mathematical mapping space of the present invention;

FIG. 6 is an embodiment of a mathematical mapping space in which the points are distributed badly in the space;

FIG. 8 depicts an alternative embodiment of a mathematical mapping space according to the present invention;

FIG. 9 is a block diagram of an embodiment of an apparatus according to the present invention;

FIG. 15A depicts the change in the mapping of an embodiment of a virtual network to servers when a node and server are added, using a standard hash function;

FIG. 15B depicts the change in the mapping of a virtual network to servers when a node and server are added, using the consistent hashing of an embodiment of the present invention.

Like reference characters in the respective drawn figures indicate corresponding parts.

DESCRIPTION OF THE PREFERRED EMBODIMENT

Consistent Hashing

Figure 4A:
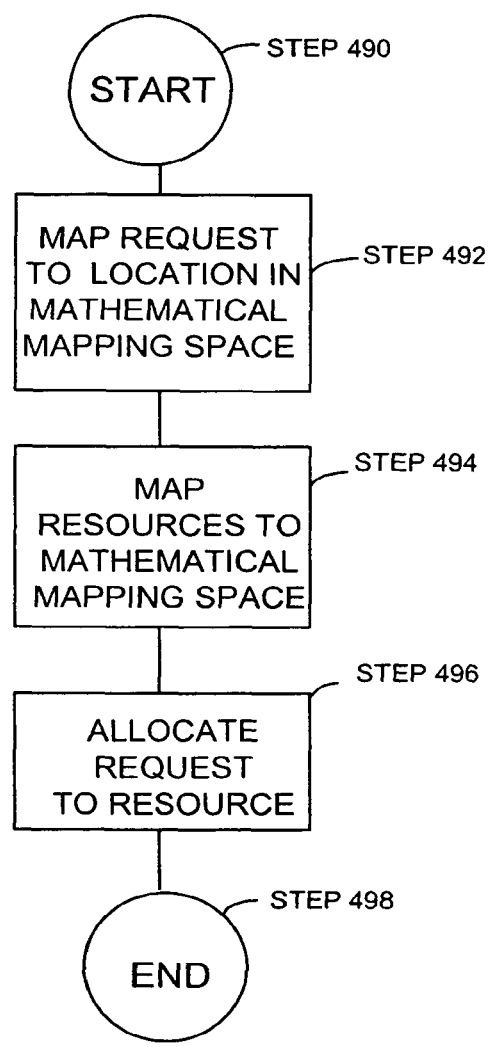
FIG. 4A is a flowchart of an embodiment of a method for allocating resources constructed according to the present invention.

In one aspect of the present invention a mathematical mapping space is chosen and a mapping is used to locate requests and resources in the mathematical space. A specific mathematical relationship is also chosen to match a request with a resource in the mathematical space. A request is assigned to the resource whose location in the mapping space has the specific mathematical relationship with the request's location in the mathematical mapping space. Referring to FIG. 4A, a request is mapped to at least one location in the mathematical mapping space (Step 492). Available resources are each mapped to at least one location in the mathematical mapping space (Step 494). These steps, step 492 and step 494, do not have to occur in the order shown, each can be accomplished independently from the other. In fact, in one embodiment, the resources are mapped once, and the mapping is stored for future use with each request. Having mapped the request and the resources to the mathematical mapping space, the request is allocated to a resource based on a mathematical relationship between the request and the resource in the mathematical mapping space (Step 496).

Figure 4B:
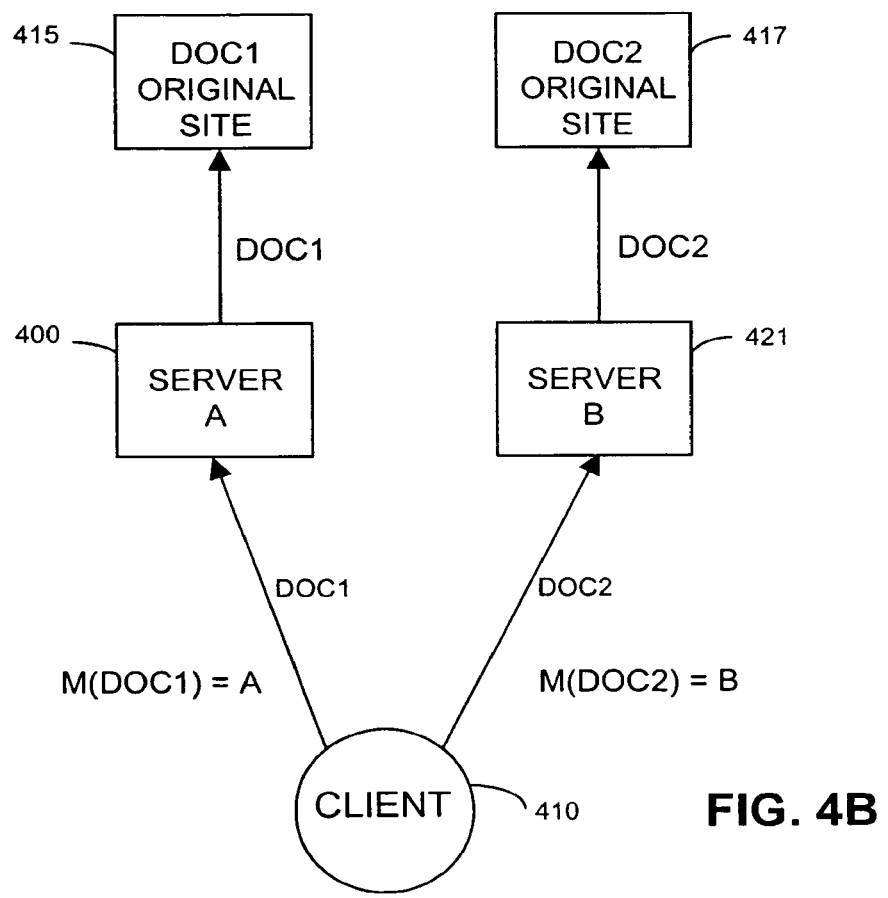
FIG. 4B is a block diagram of an embodiment of a system for allocating resources constructed according to the present invention.

By way of example, in the embodiment of FIG. 4B, a client wants to request a document from a server. In this embodiment, the request is a document request and the resources are cache servers Server A 400 and Server B 421. The client 410 requests Doc1 from a server. Referring also to FIG. 4C, the client 410 selects Server A 400 by first mapping the request for Doc1 and the available servers Server A 400 and Server B 421 into a previously selected mathematical mapping space. An embodiment of a mathematical mapping space 450 is a two dimensional space of real numbers. Doc1 408 is mapped into the mathematical mapping space 450, as are Server A 400 and Server B 421. In this embodiment, the resource that is the least distance from the request is allocated to the request. In other embodiments, other mathematical relationships could be used. Client One 410 then allocates the request to Server A 400 based on the distance relationship between Doc1 and Server A 400 in the mathematical mapping space. The distance 418 between Doc1 408 and Server A 400 is less than the distance between Doc1 408 and Server B 421. Doc1 408 is therefore allocated to Server A 400. The client 410 then requests Doc1 from Server A 400. Likewise, the client 410 requests Doc2 from Server B 421 after mapping Doc2 and the servers into mathematical mapping space 450 and determining that the distance 420 between Doc2 410 and Server A 400 is more than the distance 422 between Doc2 410 and Server B 421.

The mapping space may be any mapping space in which the requests and resources can be mapped. A mapping space is preferred that allows for efficient mapping and matching of resources to requests. In the embodiment of FIG. 4B, the mathematical mapping space is a two dimensional space of real numbers. In another embodiment, the mapping space is a line. In another embodiment, the mapping space is the three dimensional space of real numbers. In another embodiment, the mapping space has more than three dimensions. In another embodiment, the mapping space is a circle. In one embodiment, the mapping space is a circle with a circumference of one. In yet another embodiment, the mapping space is an ellipse. In another embodiment, the mapping space is a three dimensional sphere.

In one embodiment, the mapping of requests and resources to the mathematical mapping space is accomplished with a hash function. A hash function takes an input (k) and returns an output in a given range. Hash functions can be used to allocate pointers or keys to a location in a hash table, which is a data structure having a specified number of locations or "slots." If h(k) is a hash function, key (k) is said to hash to a hash table location h(k). A goal in designing a hash function is for each key (k) to be equally likely to hash to any of the locations in the hash table. An approach to achieve this is to derive the hash function in a way that is expected to be independent of any patterns that might exist in the data.

Most hash functions assume that the universe of keys is the set of natural numbers. If the input value to a hash function is not a natural number, some way is usually found to interpret the input value as a natural number. For example, if a character string is to be used as input to a hash function, it can be interpreted as an integer expressed in suitable radix notation. As an example, the string "mit.edu" could be interpreted as an integer by using the ASCII decimal conversion of the letters in the string, and treating each character as a radix 128 number, so the result would be the sum: $(109*128^0)+(105*128^1)+(116*128^2)+(46*128^3)+(101*128^4)+(100*128^5)+(117*128^6)$.

In a division method for creating hash functions, a key (k) is mapped into one of m locations by taking the remainder of (k) divided by (m). That is, the simplest form of such a hash function looks like h(k)=(k mod m). Using this simple example, if the hash table has size (m=12) and the key is (k=100), then h(k)=4. Since it requires only a single division operation, hashing by division is quite fast. More complicated hash functions can be constructed using a division method, for example, h(k)=((ak+b)mod n) for some fixed choice of integers (a) and (b), and (n) locations.

In one embodiment, a family of hash functions is used whose elements are each functions that map requests and resources to locations in mathematical mapping space. A random function (f) is chosen from such a family of hash functions (H) and function (f) is used to map requests and resources to locations. This family model of hashing is used because schemes that use a single fixed function are vulnerable to attack by parties attempting to damage the system, since the input that causes the absolute worst case behavior of the scheme can be determined.

For example, if an adversary has the power to selectively disable some number of resources, and the mapping of requests and resources to the mapping space is known to the adversary, then the adversary can selectively disable those resources that would leave a remaining resource heavily loaded, and possibly overloaded. The adversary can eliminate all resources in a portion of the mapping space, creating a gap with no resources at all. All the requests previously assigned to the eliminated resources might then be assigned to a resource whose location is on the edge of the gap. This resource might then become overloaded with requests. A way to foil such an intentional destruction of the system is to add randomization to the scheme. For example, if the locations in mapping space associated with requests and resources are chosen randomly, and an adversary is not aware of the random choices, then the adversary does not know the locations of the requests and resources in the mapping space. Therefore the adversary does not have the necessary information to selectively disable resources located in a particular part of the mapping space. Another technique to foil such an attack is to map multiple points for each resource into the mapping space. This is discussed further below.

Randomization is added by choosing a mapping function from a family of hash functions so that there is a uniform probability of choosing every function. Thus, using a hash family (H) means that first a function (f∈H) is selected and then that function is used to map requests to resources. For example, if both the set of (request and resource) items (I) and the set of (location) buckets B are in the range $\{0, 1, 2, \ldots, p-1\}$ for a prime p, then the family (H) could be defined as all the functions of the form $f(x)=((ax+b) \mod p)$ for all a, b∈$\{0, 1, 2, \ldots, p-1\}$. To use this hash family, a and b are chosen at random, and this is equivalent to choosing a function from the family at random. Then, a request or resource item is assigned to location $((aR+b) \mod p)$. In other words, the probability that a randomly chosen function (f) from the family (H) maps the request (x) to resource (i) and the request (y) to resource (j) is the same as in the case in which the two requests are mapped to the resources uniformly and independently. The family (H) is used instead of choosing a completely random function because choosing, storing, and evaluating functions from H is simple and efficient. Constants (a) and (b) can be chosen at random. These values can be stored using very little memory, and the resulting function can be evaluated simply. On the other hand, selecting a truly random function requires choosing and storing a random table containing the value of the function for every single item or seeding a known random number generator with a known value. Such a hash function may be implemented in hardware or software.

Although randomization helps balance load, the mapping does not have to be entirely random. Other information about the request of the resource can be used to map the request or resource into the mathematical mapping space. For example, geographic information may be useful for placing requests and resources located geographically near each other at least somewhat proximate in the mathematical mapping space. Similarly, it might be helpful for the location of a request or resource in a network topology to influence the location in the mathematical mapping space.

For example, if the mathematical mapping space is a grid with geographical map coordinates, the mapping function could be a random distribution around the geographic location of the resource. The random distribution would help to balance the load, and the geographic bias would help match requests and resources that are geographically proximate.

The mathematical relationship that is used to match requests with resources can be any mathematical relationship that allows requests to be matched with resources. A mathematical relationship is preferred that can be determined efficiently. In the embodiment of FIG. 4C the resource that is the least distance from the request is allocated to the request. In other embodiments in which the mathematical space is a circle, a request is assigned to the resource whose location is the first encountered when the mapping space is traversed either clockwise or counter-clockwise from the request's location. In other embodiments, the request may be assigned to the resource whose location is any specific number of points from the request location.

Once a request has been matched with a resource according to the relationship of the request and the resource in the mathematical mapping space, the request is allocated to the resource. In one embodiment, the allocation is reported to the operating system, user, browser, or other entity that will use the information. In another embodiment, the allocation takes place automatically so that the reporting actually allocates the resource.

Figure 5B:
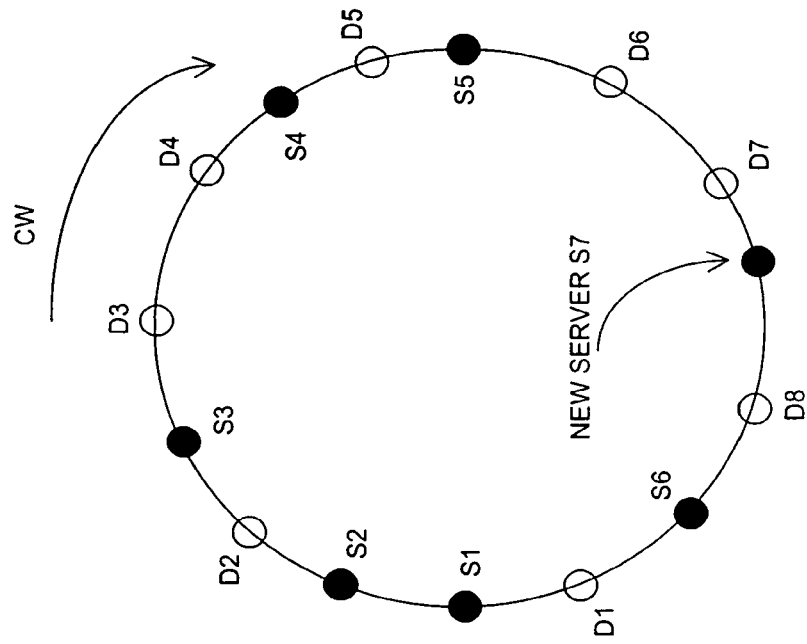
FIGS. 5A and 5B are embodiments of mathematical mapping spaces according to the present invention.
Figure 5A:
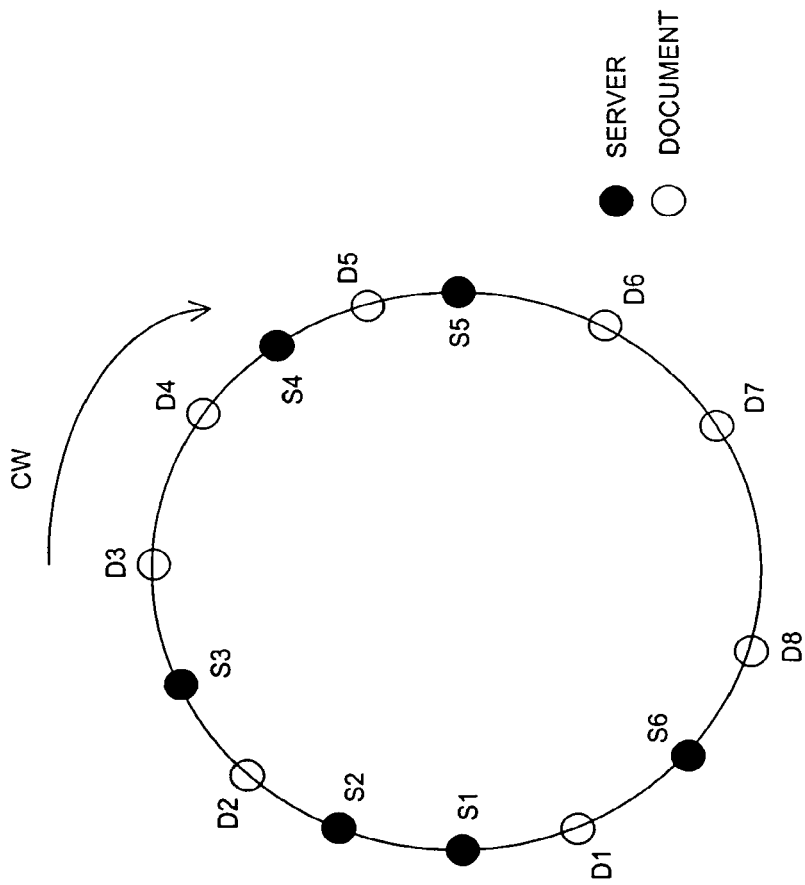

In one embodiment shown in FIG. 5A and FIG. 5B, documents are allocated to a plurality of caching servers. The mathematical mapping space that is used is a circle that has a radius of 1. Both documents and servers are mapped to points on the circle using a hash function, as indicated by document points D1-D8 and server points S1-S6 on the circle. A document is to be assigned to the closest server moving clockwise around the circle. Arrow CW shows the clockwise direction of mapping of documents to servers. In this embodiment, Document D1 is assigned to server S1, document D2 is assigned to server S3, documents D3 and D4 are assigned to server S4, document D5 is assigned to server S5, and documents D6, D7, and D8 are mapped to server S6.

Figure 1A:
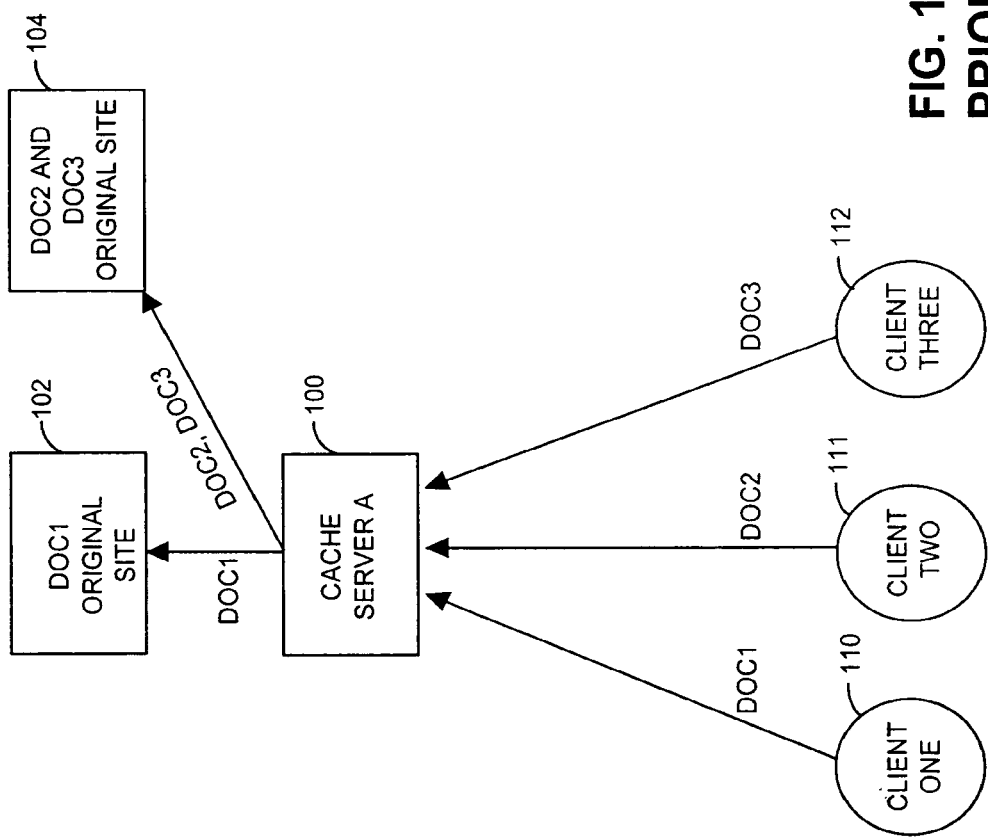
FIG. 1A is a block diagram of clients requesting documents from a cache server as known to the prior art.
Figure 2A:
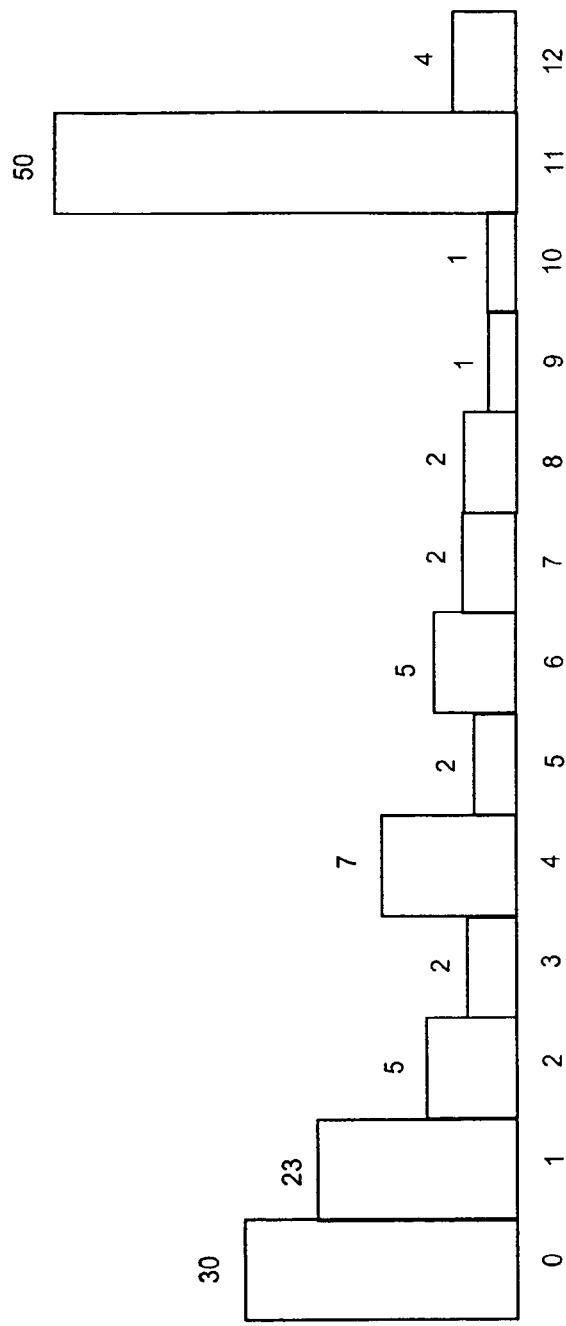
FIG. 2A is a graph of the distribution of documents to servers as known to the prior art.
Figure 2B:
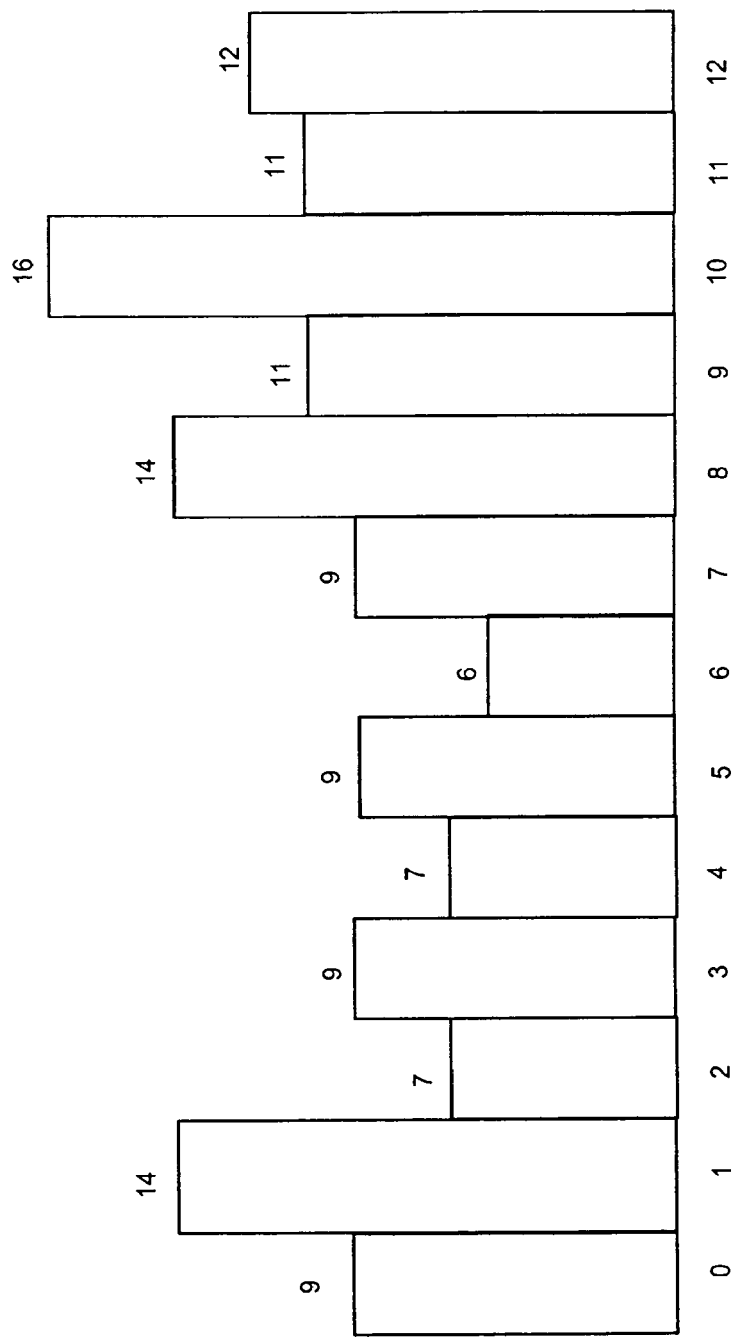
FIG. 2B is distribution of documents to servers using a standard hash function as known to the prior art.
Figure 3A:
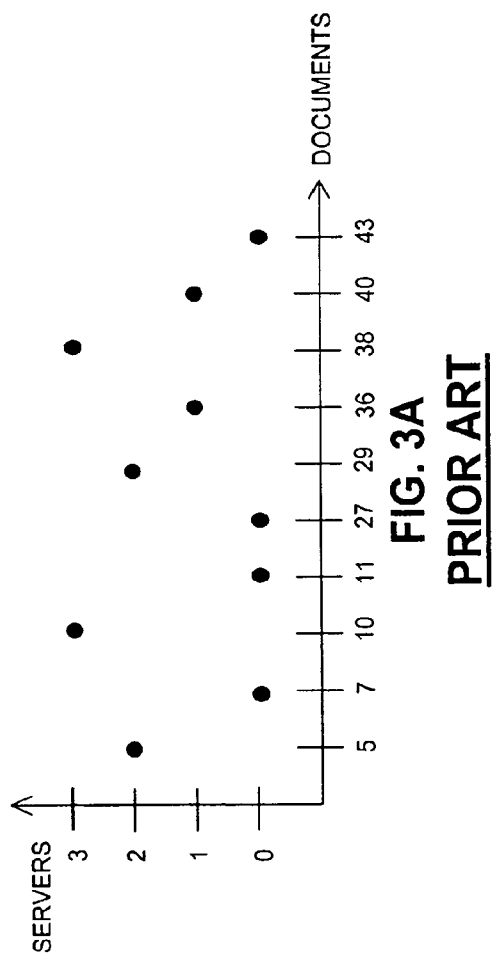
FIGS. 3A and 3B are distributions of documents to four and five servers using a standard hash function as known to the prior art.
Figure 3B:
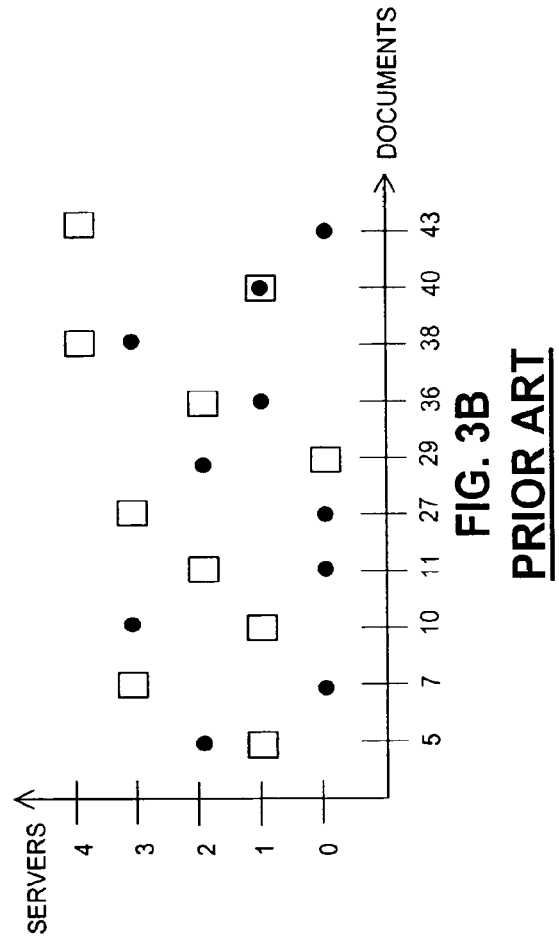
Figure 5C:
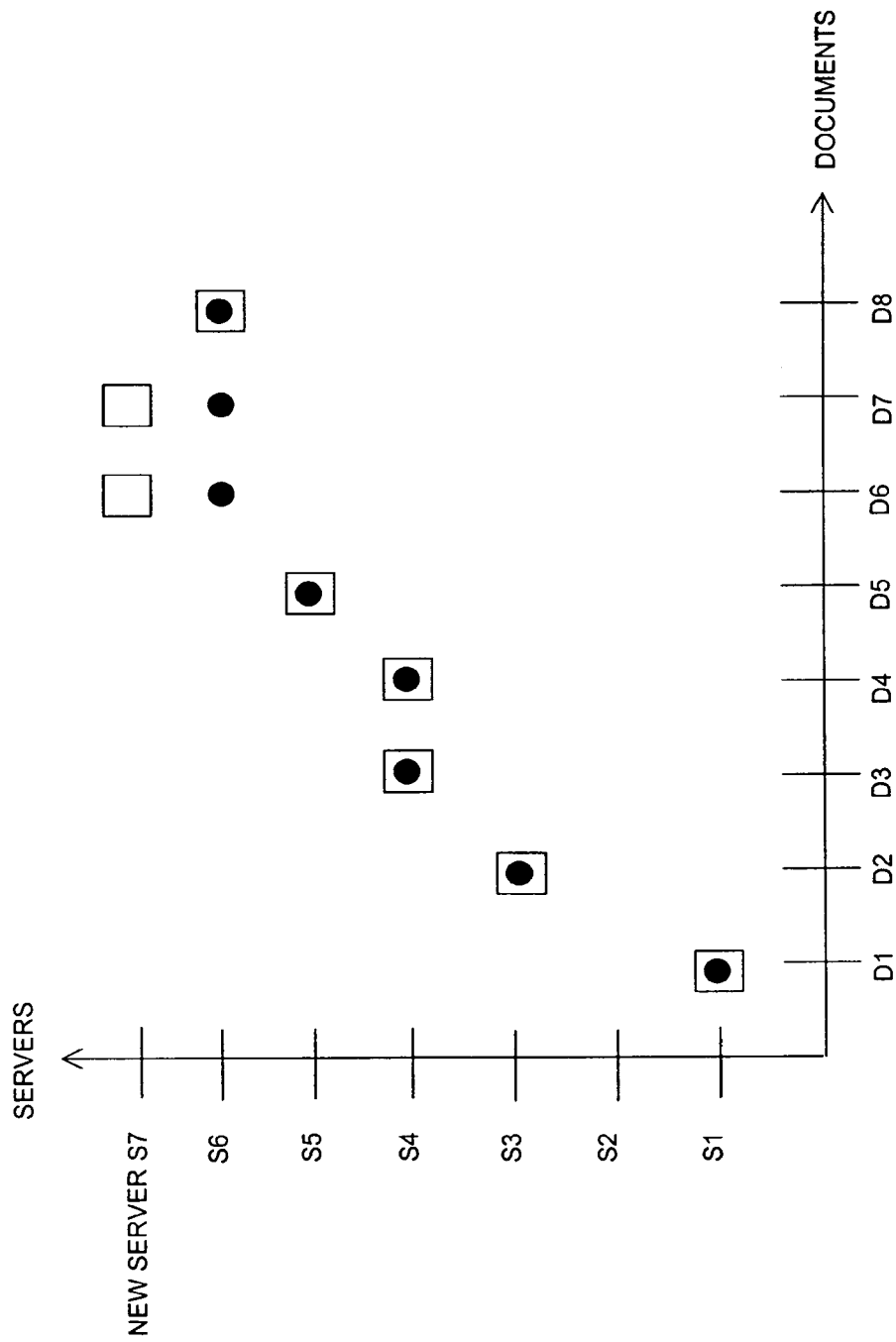
FIG. 5C is a graph of an example of distribution changes that occur when a server is added to a network according to an embodiment of the present invention.

FIG. 5B depicts an embodiment of the same system after a new server is added. The new server is shown as Server S7. With the addition of the new server, the only documents that are reassigned are those now closest to the new server going clockwise around the circle. Thus only documents D6 and D7 move to Server S7, other documents remain with the server they were previously matched with. FIG. 5C shows the change in the mapping of documents to servers before and after the addition of a new server. Circles are the previous mapping (as in FIG. 5A) and squares show the new mapping (as in FIG. 5B). This shows a significant improvement over the results in FIG. 3 in that many fewer documents have changed servers with the addition of a new server. In fact, only the documents associated with the new Server S7 are reallocated.

In this embodiment, if a document is assigned to a server in one view, then that document's location in the mapping space is likely to be relatively close to the server's location in the mapping space in all views. This is because another server would probably be in between the document and the server if the document and the server were not close to each other. If, in this embodiment, server points are evenly distributed around the circle, only a few document points fall close to a server's point. Even if there are a large number of views, only a relatively small number of documents will be assigned to a server, and the load should not increase more than logarithmically with the number of views. Likewise, even if there are many views, only a few servers will have responsibility for any one document. The spread of a document therefore does not increase dramatically with the number of views. These properties allow a caching scheme to grow gracefully. Servers can be added to the network without disrupting the caching and multiple views of the servers can exist without degrading the performance of the system.

The benefits of decreased load and spread depend on an even distribution of the resources in the mapping space. In one embodiment, requests and resources are mapped to random points around a circle, and a request is mapped to the resource whose point is encountered first when the circle is traversed clockwise from the item's point. In this embodiment, there is a small probability that points could be distributed badly around the circle so that one resource is responsible for a disproportionate section of the circle. Such an unfortunate instance is shown in FIG. 6, in which points 6A-6F are all on one side of the circle. All request points on the left half of the circle would be mapped to resource 6A.

In one embodiment, in order to decrease the likelihood of such an unlucky event as the poor distribution of FIG. 6, a resource is assigned to two or more locations in the mapping space instead of just one. In this embodiment, requests are still assigned to a single point on the circle and are mapped to the resource that has a point nearest to the request's point in a predetermined direction. When the number of resource points (m) is larger, there is less of a chance that the points will be unequally distributed around the circle. The number of resource points (m) need not be unmanageably large for there to be a very good chance of an even distribution of points in the mapping space.

Figure 7A:
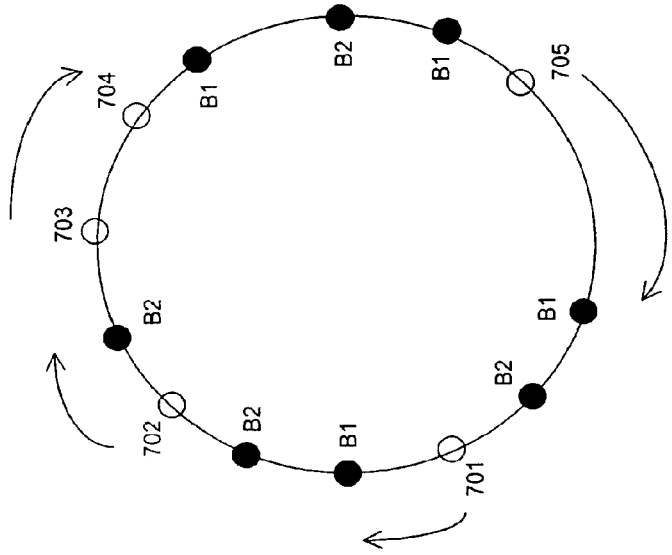
FIGS. 7A, 7B, and 7C depict an embodiment of a mathematical mapping space according to the present invention.

In one embodiment, the mapping space is a circle as in FIG. 7A. In this embodiment, the mapping function is chosen from the family of standard hash functions $y=(ax+b)$ mod n. The number of points (n) is the number of possible points that the requests and resources can be mapped to. Four sets of constants (a) and (b) are chosen randomly to map the resources and one set of constants (a) and (b) are chosen to map the requests.

The use of multiple points has the added benefit of making it much harder for an adversary to create holes in the mapping by selectively eliminating a small subset of the servers, thereby overloading a remaining server and causing it to crash, which will then overload another server and cause it to crash, and so on. If the multiple points for each server are evenly and randomly distributed in the mapping space, the elimination of one server will not put a great burden on any one or subset of the remaining servers.

Figure 7B:
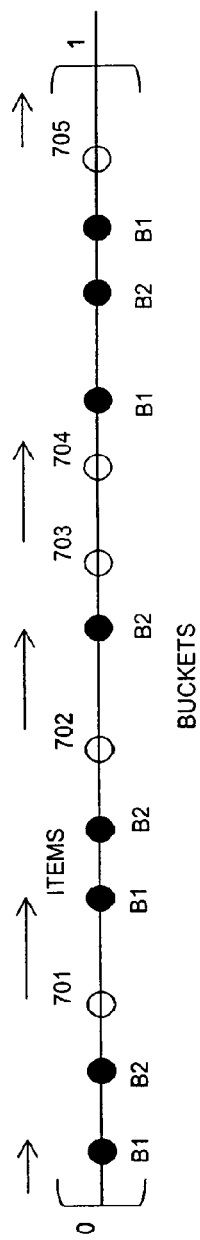
Figure 7C:

Referring to FIG. 7A, resources B1 and B2 each have 4 points on the circle. Requests are mapped to the resource closest to the resource in the mapping space as measured in a clockwise direction. Request 701 is closest in a clockwise direction to a point of resource B1 and request 702 is closest in a clockwise direction to another point of resource B2. Requests 703 and 704 are closest in a clockwise direction to another point of resource B1. Request 705 is closest in a clockwise direction to another point of resource B1. In FIG. 7B, the circular mapping space is drawn as a linear interval of length one where we imagine that the endpoints of the interval are "glued together." The points on the line mark the intervals shown in FIG. 7C. The intervals indicate the mapping space that resources B1 and B2 are responsible for. Resource points are responsible for the interval from the location of the resource to the next point directly to the left. Since there are multiple copies of each resource, resources are responsible for a set of intervals.

When a resource is mapped to multiple points, there is a small but positive probability that when a random function is chosen from the family, two points from one resource could be mapped to the same location in the mapping space. In one embodiment, if this happens, some arbitrary fixed order of the assigning the points on the circle is used. In another embodiment, the probability that such a function is chosen is made arbitrarily small by using more bits of precision.

In one embodiment, a request is made to the first resource in a particular direction around the circle. If that resource does not have the item, the request is made to the next resource clockwise around the circle. In this way, a path is determined of resources to query for a request. In one embodiment, this is combined with the virtual networks discussed below, but it can also be used instead of the virtual networks.

In another embodiment, a request is always mapped to the same location in the mathematical mapping space. Each resource is mapped into the mathematical mapping space using a mapping function that is a function of the resource and the request. Because the resource mapping function is a function of both the resource and the request, the locations of the resources in the mapping space will depend, in part, on the request. Referring to FIG. 8, an embodiment of a circular mathematical mapping space is shown where the request 801 is always mapped to the origin point at the top of the circle. The resources 802-809 are mapped to the mathematical mapping space using a mapping function that is a function of the resource and the request. Such a function, for example, might be $(((f(i) \cdot ax)+b) \bmod n)$, where f(i) is a function of the request (i), (x) is the resource to be mapped, (a) and (b) are constants, and (n) is the number of points around the circle. The result is that for one value of (i), (for example, i=1), resource (x) will be mapped to one location, and for a different value of (i), (for example, i=2), resource (x) may be mapped to a different location, depending on f(i), that is, depending on whether f(1) is different than f(2). Referring to FIG. 4A, the step of mapping the request in step 492 would always map the request to the same location. Mapping the resources into the mathematical mapping space in step 494 would occur using a mathematical mapping function that takes into account both the request and the resource.

Referring to FIG. 9, an embodiment of an apparatus according to the present invention includes an input 810, which receives a resource request 815. The input 810 receives the request 815 and passes the request 815 on to the distributor 830. In one embodiment, the input 810 receives a request 815 over a computer network. In another embodiment, the input 810 receives a request 815 from another process on the same computer. The input 810 can be implemented in hardware or software.

The distributor 830 uses the mapper 820 to map the request 815 and the resources 850 into a mathematical mapping space and to determine the allocation of the request 815 to one of the resources 850. In one embodiment, the mapper 820 includes mapping space data stored in a binary tree structure for fast access. Each resource is stored in the binary tree, and then the request 815 can be matched to one of the resources 850 by searching the tree. Other types of storage structures can be used as well, for example an array or linked list.

In one embodiment, the mapping space store has a function AddResource(r), which adds a resource to the store. It also has a function DeleteResource(r), which deleted a resource from the store. It also has a function MatchRequest(r), which provides the resource that is greater than or equal to (r). If there is no such resource, meaning that the request has wrapped around the circle, the MatchRequest(r) function provides the resource at the smallest numbered point. The distributor 830 accesses the mapper through the functions just described. By using the MatchRequest(r) function, the distributor 830 can allocate the request 815 to one of the resources. The mapper 820 can be implemented in hardware or software. The mapper 820 can store the locations of the resources in a tree structure as described, or it can receive a list of the resources 850 to be mapped with each request 815.

In one embodiment, the distributor 830 periodically obtains information about the resources 850 that are available, so that it can use the AddResource( ) and DeleteResource( ) functions to keep the view current. After selecting one of the resources 850 to allocate to the request 815, the distributor 830 allocates the request 815 to the one of the resources 850, and outputs any information necessary to allocate the request 815 to the resource via output 840.

Virtual Networks

The consistent hashing method and apparatus just described is particularly useful when combined with another aspect of the present invention, in which a virtual network of cache servers is used to prevent any server from having too many requesters asking it for a particular document. The virtual network does not require an unmanageable number of messages to be communicated among the servers, and at the same time provides for a low probability that any server will be overloaded. A different network of servers is used for each particular document. Use of a different network for each document spreads the load so that none of the servers is at the same part of the network for a disproportionate number of documents.

In one embodiment, a client requesting data from a group of servers uses a virtual network of nodes that are not initially mapped to servers. The client chooses a first node on the virtual network to be the node that will receive the client's request. The root node is the last node before a request is passed on to the original site for the document. The choice of a first node may dictate, at least in part, a path of nodes from the first node to a root node on the virtual network. As described further below, the client then maps the nodes on the path of nodes in the virtual network to actual servers. Having mapped the nodes to servers, the client requests the data from the server mapped to the first node. In one embodiment, the request includes the path of nodes and the servers mapped to those nodes. If the server mapped to the first node does not have the document, the server mapped to the first node requests the document from the server mapped to the next mode on the path from the first node to the root node in the virtual network of nodes. If this server does not have the document, it will in turn ask the server corresponding to the next node on the path. Each server that maps to a node on the path from the first node to root node may ultimately be queried for the document if the document is not located on the proceeding node. Finally, if the server that maps to the root node does not have the document, the server that maps to the root node will request the document from the original site for the document.

Figure 10:
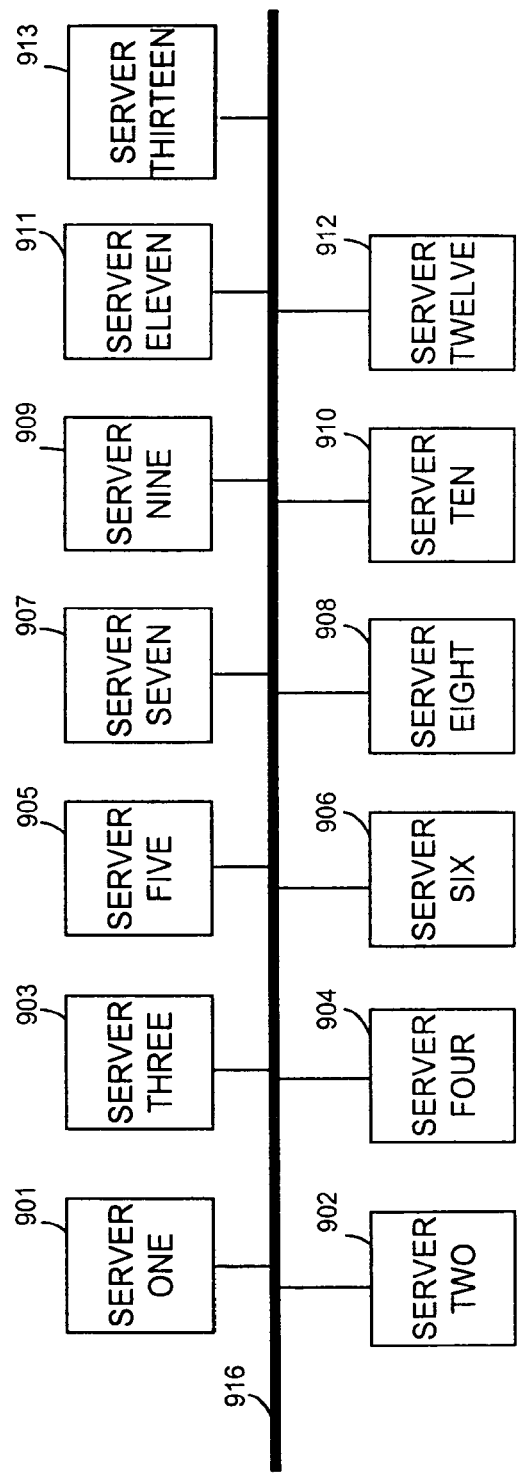
FIG. 10 is an embodiment of a group of servers according to the present invention.

Referring to FIG. 10, a group of thirteen cache servers 901-913 are individual computers, each with their own RAM, ROM, processor(s), and storage media. The servers 901-913 are connected by a network 916. Together, servers 901-913 handle requests for documents. The number of servers is not central to the invention. There can be as few as two servers, and an unlimited maximum number of servers. The type of server is also not central to the invention. In another embodiment, the servers are each individual processor boards connected to a single bus and network interface. In yet another embodiment, the servers are individual software processes that execute on a multithreaded computer system.

Figure 11:
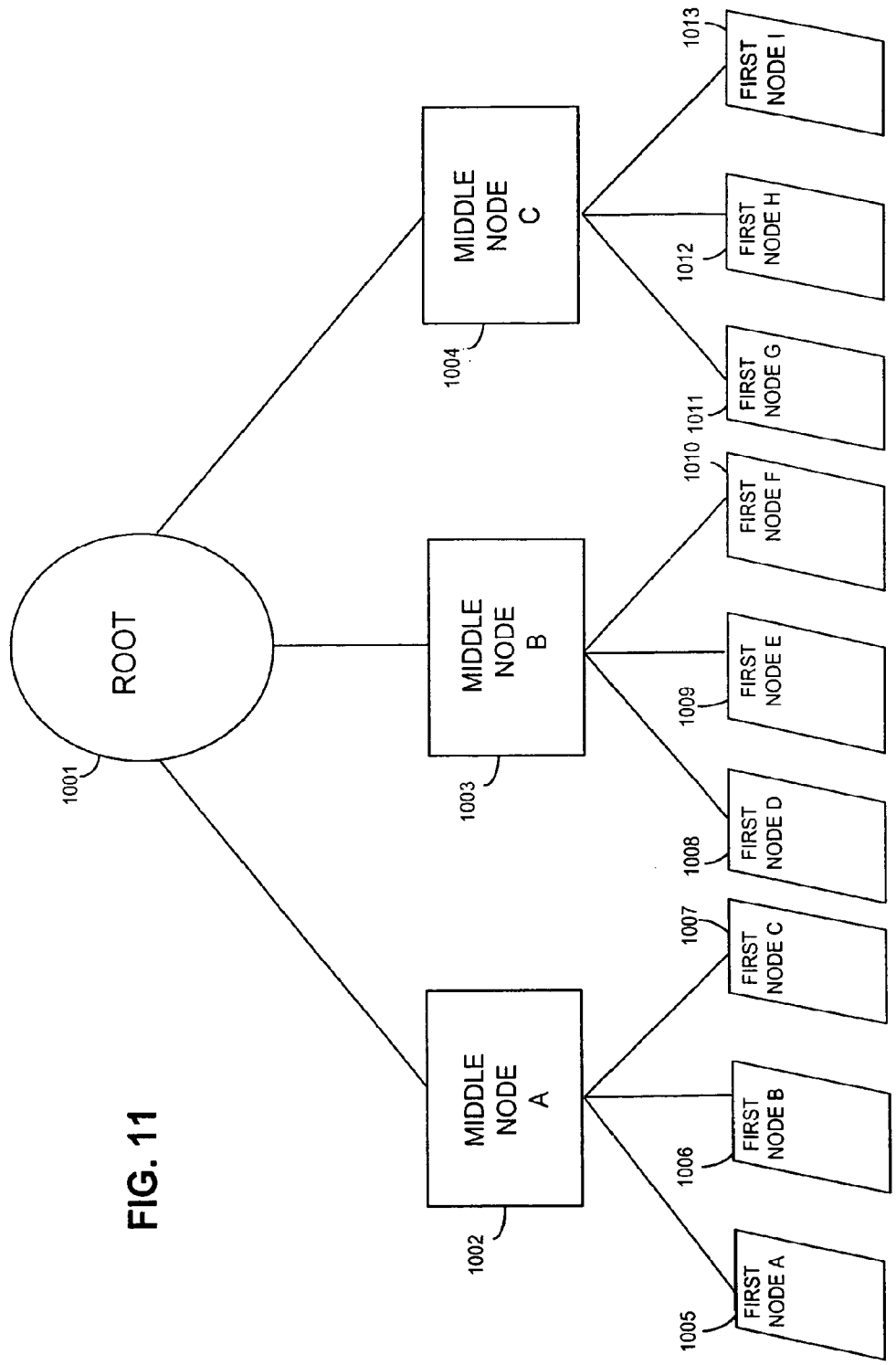
FIG. 11 is an embodiment of an virtual network according to the present invention.
Figure 12:
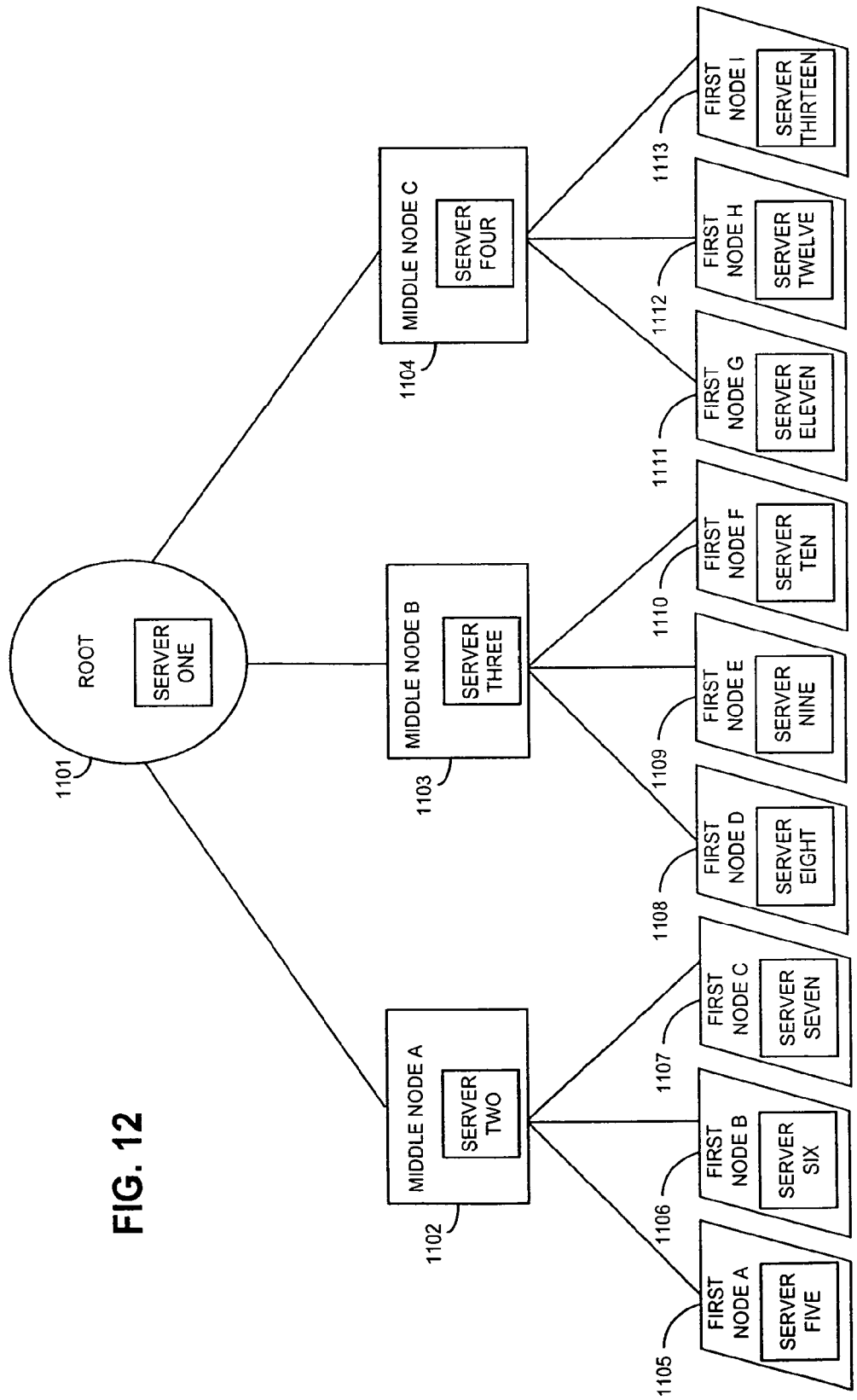
FIGS. 12 and 13 are each mappings of the virtual network of FIG. 11 to the group of servers of FIG. 10 according to an embodiment of the present invention.
Figure 13:
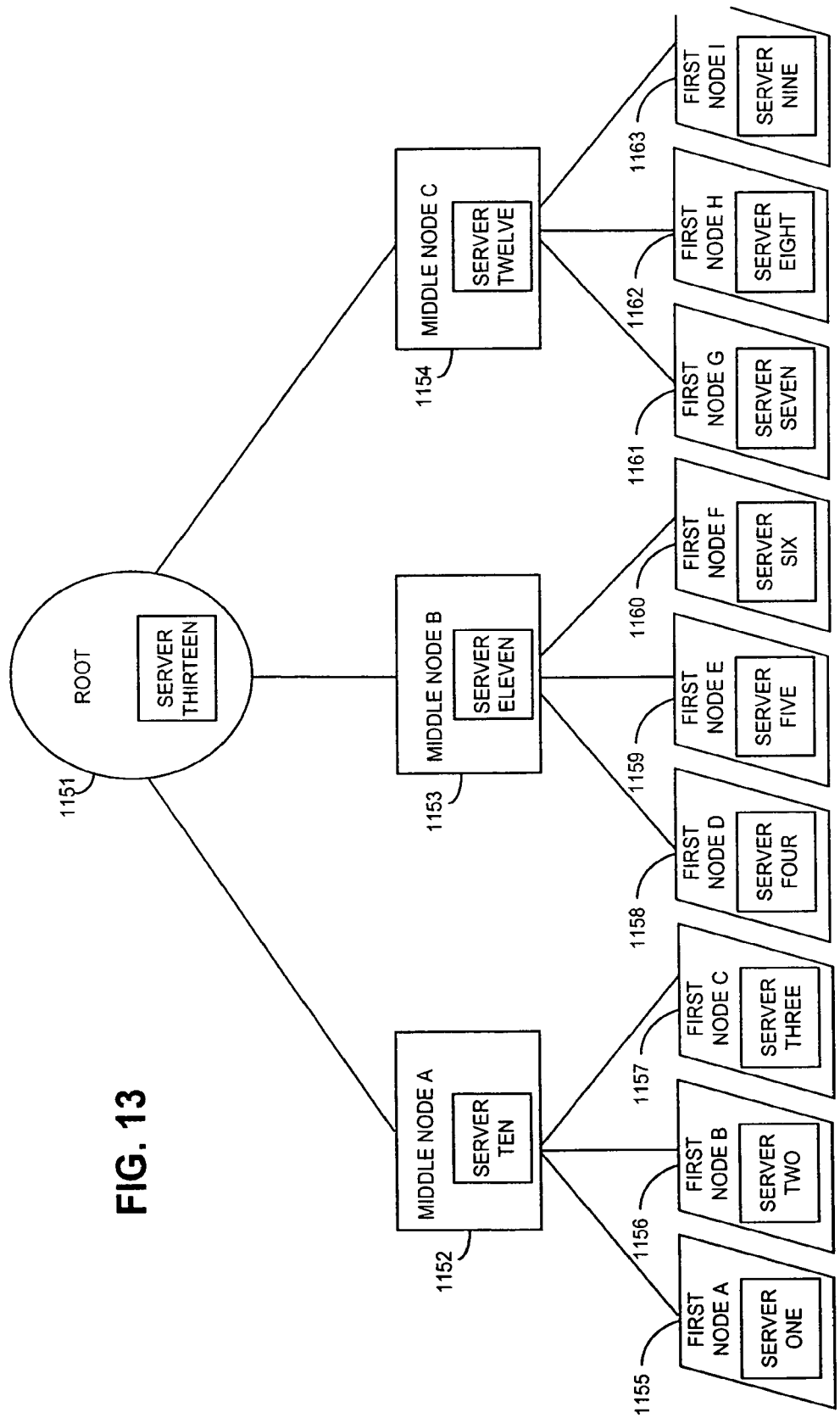

An embodiment of an virtual network of nodes that can be used with the server group of FIG. 10 is shown in FIG. 11. This particular embodiment shows a tree structure, but the invention is not limited to tree networks. Each of the thirteen nodes 1001-1013 represents one cache. Each node 1001-1013 can be mapped to a server 901-913. For example, FIG. 12 shows one mapping of the virtual network of FIG. 11 to the servers of FIG. 10. In this mapping; root node 1101 is mapped to Server One. Middle Node A 1102 is mapped to Server Two. First Node A 1105 is mapped to Server Five. FIG. 13 shows an alternate mapping of the virtual network of FIG. 11 to the servers of FIG. 10. In this mapping, root node 1151 is mapped to Server Thirteen. Middle Node A 1152 is mapped to Server Ten. First Node A is mapped to Server One.

These are just two of the many possible mappings of the virtual network of FIG. 11 to the servers of FIG. 10. The examples of FIG. 12 and FIG. 13 demonstrate that the different mappings from virtual network to servers map different servers at each level of the network. For example, in the mapping of FIG. 12, Server One is mapped to the root node 1101. In the mapping of FIG. 13, Server One is mapped to First Node A 1155. If different mappings are used for different documents, there will be some documents for which a particular server will be the root, and there will be other documents for which that server will be a first node or middle node. This distributes the load associated with a particular position in the network.

Mapping of the virtual nodes to servers can be accomplished using a standard hash function. The mapping can also be accomplished with the consistent hashing of the present invention. Consistent hashing provides the added benefit of allowing servers to be added and removed without disrupting the caching scheme.

Figure 14:
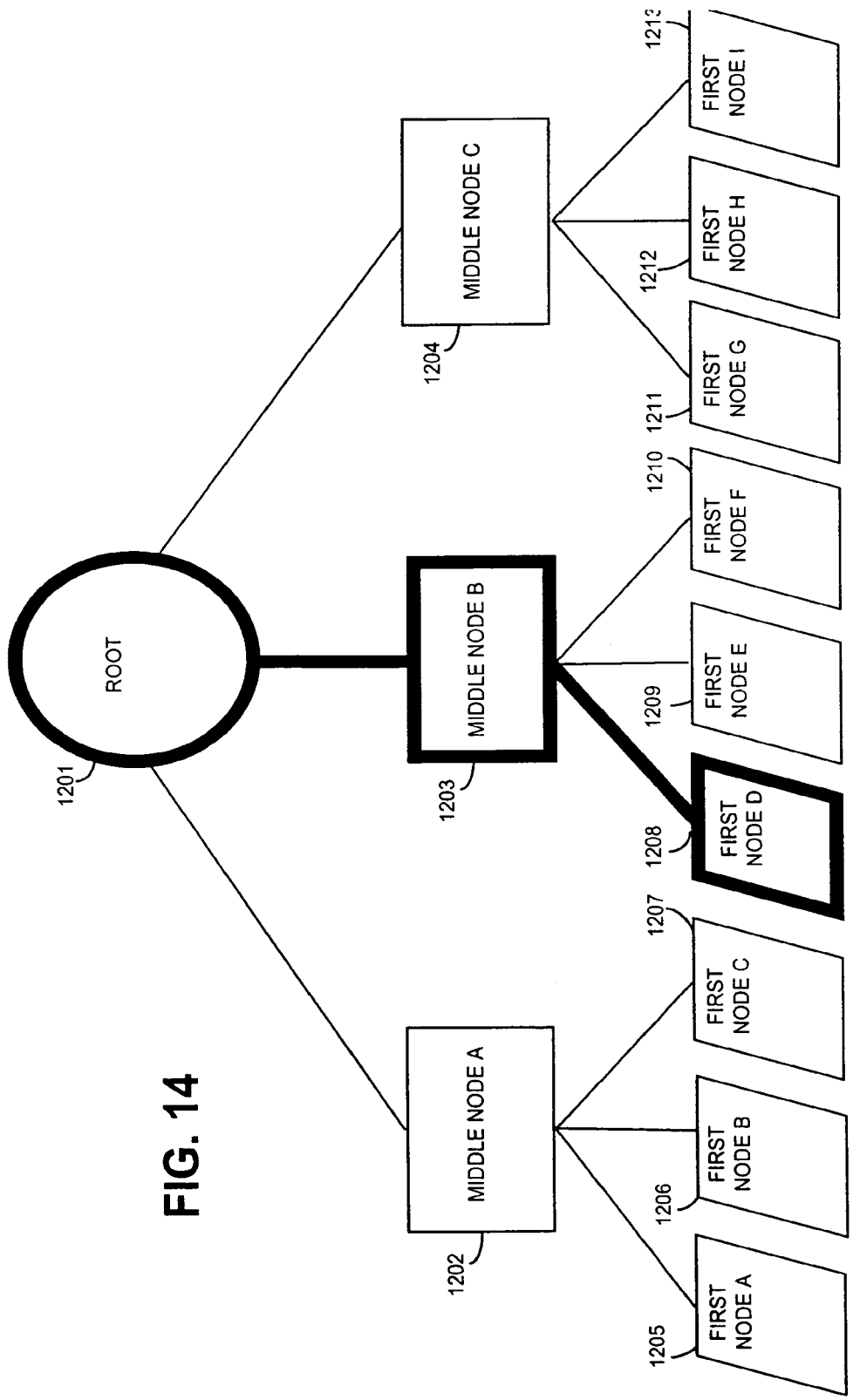
FIG. 14 is a path on the virtual network of FIG. 11 according to an embodiment of the present invention.

In one embodiment, none of the virtual nodes 1001-1013 are initially mapped to a particular server. A first node on the virtual network is chosen. In one embodiment, the first node is chosen randomly from all of the nodes on the virtual network. In another embodiment, the first node is chosen from a subset of the first nodes determined by the identity of the client. In another embodiment, the first node is chosen from a subset of the first nodes determined by the document requested. The choice of a first node dictates, at least in part, a path of nodes from the first node to the root node. For example, FIG. 14 shows the virtual node network of FIG. 11 in which first node D 1208 on the virtual network has been chosen. This dictates a path from first node D 1208 to next node B 1203 to root 1201.

Once a first node has been chosen and a path of nodes determined, the nodes on the path of nodes can be mapped to the actual servers. Each node on the path can be mapped to a server. In a preferred embodiment, the mapping of nodes to servers is based on the name of the document requested. Having mapped the nodes to servers, the client requests the data from the server mapped to the first node. In one embodiment, the request includes the path of nodes and the servers mapped to those nodes. If the server mapped to the first node does not have the document, it will request the document from the server mapped to the next node of the first node in the virtual network.

In another embodiment, each node on the virtual network of nodes is first mapped to a server, thereby determining a network of servers for a particular document. A first server on the network of servers, and a path from the first server to the root can then be chosen for a request. While this ordering of steps is also a functional embodiment of the invention, it has the disadvantage of requiring all nodes to be mapped. Choosing a path on the virtual network first, and then mapping the nodes on the path second, requires fewer nodes to be mapped to servers, and therefore requires less calculation time.

In another embodiment, the request does not include the path of nodes and servers mapped to those nodes. In this embodiment, each server that needs to request the document from another server uses the information about the document requested to create its own virtual network, map nodes to servers and determine the next server. In this embodiment, the client need only determine the server mapped to the first node, and not the entire path.

In one embodiment, when a server receives a request, it first checks to see if it is caching a copy of the document or is in the process of getting one to cache. If so, it returns the document to the requester, after it gets its copy if necessary. Otherwise, it increments a request counter for the document requested and the virtual node it is acting as, and asks the next server on the path for the document. If the request counter reaches a defined number of requests, when acting as a particular virtual node, then the cache server caches a copy of the document. In either case the cache passes the document on to the requester when it is obtained.

When consistent hashing is used to map nodes to servers, there is an additional benefit that servers can be added and removed without disrupting the caching scheme. Referring to FIG. 15A, an embodiment of a virtual network is shown in which two clients C1 and C2 have different views. C1 is aware of servers {1 . . . 6} and C2 is aware of servers {1 . . . 7}. FIG. 15A shows a virtual network mapped to servers using a standard hash function for a particular document for the two views. In the first view of FIG. 15A, C1 starts with the server mapped to node 5. The path from first node to root is 5-1-3. In the second view, the servers are mapped very differently because of the addition of a new server. C2 starts with the node mapped to server 6, and the path is 6-7-2. No servers are the same.

Referring to FIG. 15B, the same views are shown, but with the mapping of nodes to servers using consistent hashing. In the first view, C1 first requests from the node mapped to server 6. The path is 6-4-1. In the second view, using consistent hashing, the mapping is much closer to that of the first view than it was with the standard hash function. The first node is the node mapped to server 7. The path is 7-4-1. Since the nodes mapped to servers 4 and 1 are the same servers in both views, it is likely that server 4 or server 1 will have a copy of the document.

Figure 16:
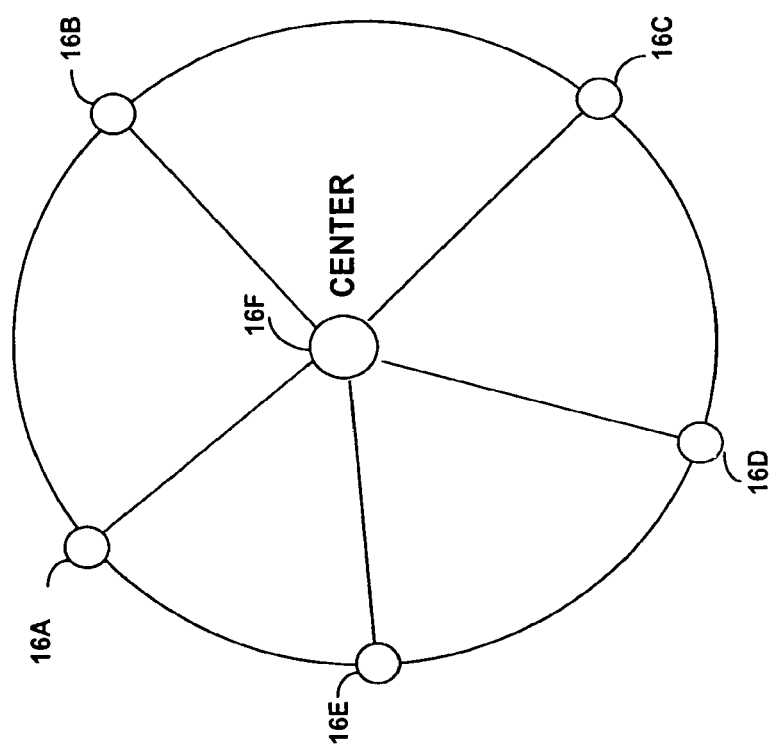
FIG. 16 is an alternative embodiment of a virtual network according to the present invention.

Referring to FIG. 16, the disclosed embodiment of a non-hierarchical virtual network is a circle with spokes connected to center node 16F. The root of this virtual network is the center node 16F, and any node 16A-16E on the circle can be the first node. As described above, a hierarchical network has beneficial properties, such as being useful for reducing hot spots. Other virtual networks, like the one in FIG. 16 have other benefits, such as a resemblance to an existing network topology, or utility for a particular routing protocol. As in the hierarchical network, a first node is chosen to receive a particular request, and a path chosen from the first node to the root node for that request. For the embodiment of FIG. 16, the path is chosen by a clockwise traversal of the circle. When the requests have gone around the circle and reached the node before the first node, the request is then passed to the root. After the path has been chosen, the nodes are mapped to servers. The nodes can be mapped to servers using a hash function that takes into account the information being retrieved. The hash function may also take into account other factors. Use of the consistent hashing described above provides the added benefits discussed earlier, such as the ability to add and remove servers without disrupting the caching scheme.

Having described preferred embodiments of the invention, it will now become apparent to one of skill in the art that other embodiments incorporating the concepts may be used.

The invention as described with regard to cache servers works equally well for general storage of objects in a computer or computer network, where the requests are data to be stored or retrieved from a data store and the resources are the data store. For example, the invention is applicable to a collection of documents that spans multiple disks, or other large data store, within a single computer system. Consistent hashing can, be used to allocate documents to disks. This would help balance load, and allow for addition and removal of disks with a minimum data reorganization. Virtual networks of caches could be used in such a system between the disks and one or more processors. This would particularly be useful for a computer system storing many documents on many devices.

Networked distributed file systems, groups of computers that store large amounts of data on an intranet or internet, and have too much information to effectively serve on one server, can use the invention to great benefit. Consistent hashing can be used to allocate documents to servers, thereby making it possible for servers to be added and removed from such a system with minimal impact on the locations of much of the data stored in the servers. A virtual network of caches can stand between the users of the distributed file system and the distributed file system, to spread the load on the servers.

An example of such a system is a large library of documents. Another example is a personal file service. Such a service would allow a user to store his files on a collection of central servers. Any device connected to the network having proper authentication could have access to those files. The files could include such computer data such as electronic, video, and voice messages, commonly referred to as email and voicemail. Such a personal file service, if implemented for large number of users, would benefit from the consistent hashing and replication of the present invention. It could, for example, enable large scale military command and control systems. Such a system could deliver messages that simulate a broadcast, by allowing many users to access files at the same time.

Another application of the present invention is in the area of servicing requests for suddenly popular web pages. A server system using the present invention can provide service for "hot" web sites that experience short-term traffic surges. For example, sites providing a new release of software, recent photographs from outer space exploration (as occurred with the Mars lander), and sites reporting scores during a sports event of limited duration (such as during a college basketball tournament) receive extremely high volumes of requests for relatively short periods of time. The short periods might not justify a significant hardware investment. A server enabled by the present invention could be farmed out these sites to handle high-traffic periods.

A file system capable of handling many document requests also enables delivery of digital motion pictures and other content on demand using a computer network as a delivery system. In such a system, motion pictures are stored in time slice increments such as one minute intervals. A two hundred minute movie then consists of two hundred files, each of which can be retrieved from a server. Delivering a movie to many users would place a great load on one server, yet, by breaking the movie up into manageable chunks, it can be delivered effectively from multiple servers. By incorporating the present invention into such a delivery system, the load of delivering the documents can be spread evenly, and with the possibility of adding and removing servers without reshuffling the entire file system.

Other areas in which requests are allocated to resources that could benefit from the present invention include, but are not limited to a user allocated to one of a plurality of data channels in a communications network, a telephone caller allocated to one of a plurality of operators, and a physical object allocated to one of a plurality of storage locations.

It is felt, therefore, that these embodiments of the invention should not be limited to disclosed embodiments but rather should be limited only by the spirit and scope of the following claims.

We claim:

1. An apparatus for responding to data requests made by a client, the apparatus comprising:
    an input for receiving a first data request comprising a sequence of virtual server nodes that is present in a virtual network of servers, the sequence of virtual server nodes corresponding to a sequence of actual servers;

a processor that executes computer readable instructions; and computer memory that stores computer readable instructions that, when executed by the processor, cause:

decision logic to determine whether data specified in the first data request is available on a selected actual server, and if the data is not available to determine a next virtual server node from the sequence of virtual server nodes;

a mapper to map an actual server to the next virtual server node; and an output to request the data by transmitting a second data request to the actual server mapped to the next virtual server node.

2. The apparatus of claim 1, wherein the mapper calculates a hash function in mapping the actual server to the next virtual server node.

3. The apparatus of claim 1, wherein the first data request is substantially similar to the second data request.

4. The apparatus of claim 1, wherein the second data request comprises a sequence of virtual server nodes.

5. The apparatus of claim 1, wherein the selected actual server is a cache server.

6. The apparatus of claim 5 further comprising a request counter that is incremented each time that the data in the first data request is requested.

7. The apparatus of claim 6, wherein the apparatus further caches the data requested by the first data request in the cache server when a count in the request counter exceeds a threshold.

8. The apparatus of claim 1, wherein the input receives the first data request over a computer network.

9. The apparatus of claim 1, wherein the apparatus is a computer and the input receives the first data request from a process that is on the same computer as the input.

* * * * *